(12) United States Patent
Yu

(10) Patent No.: US 9,769,798 B2
(45) Date of Patent: Sep. 19, 2017

(54) METHOD FOR INFORMATION TRANSMISSION, BASE STATION, AND USER EQUIPMENT

(71) Applicant: Huawei Technologies Co., Ltd., Shenzhen (CN)

(72) Inventor: Zheng Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 122 days.

(21) Appl. No.: 14/713,580

(22) Filed: May 15, 2015

(65) Prior Publication Data
US 2015/0249971 A1    Sep. 3, 2015

Related U.S. Application Data

(63) Continuation of application No. PCT/CN2012/084679, filed on Nov. 15, 2012.

(51) Int. Cl.
*H04W 72/04* (2009.01)
*H04W 72/12* (2009.01)
(Continued)

(52) U.S. Cl.
CPC .......... *H04W 72/04* (2013.01); *H04W 52/02* (2013.01); *H04W 72/085* (2013.01);
(Continued)

(58) Field of Classification Search
None
See application file for complete search history.

(56) References Cited

U.S. PATENT DOCUMENTS

2005/0063341 A1* 3/2005 Ishii .................. H04W 74/06
  370/332
2005/0232176 A1* 10/2005 Van Lieshout ......... H04W 4/06
  370/312
(Continued)

FOREIGN PATENT DOCUMENTS

CN       1602088 A    3/2005
CN     102484509 A    5/2012
(Continued)

OTHER PUBLICATIONS

"3rd Generation Partnership Project; Technical Specification Group Radio Access Network; Evolved Universal Terrestrial Radio Access (E-UTRA); LTE coverage enhancements (Release 11)" 3GPP TR 36.824, V11.0.0, pp. 1-18, 3rd Generation Partnership Project, Valbonne, France (Jun. 2012).

*Primary Examiner* — Bunjob Jaroenchonwanit
(74) *Attorney, Agent, or Firm* — Leydig, Voit & Mayer, Ltd.

(57) ABSTRACT

Embodiments of the present invention provide a method for information transmission. The method includes determining multiple enhanced transmission occasion configurations; determining a first enhanced transmission occasion configuration according to a channel loss magnitude with a user equipment, a time width occupied by the enhanced transmission occasion is greater than a time width occupied by a non-enhanced transmission occasion; sending information according to the first enhanced transmission occasion configuration. Embodiments of the present invention also provide a base station and user equipment, configured to determine an enhanced transmission occasion configuration according to the range which the channel loss magnitude belongs to. Therefore, the base station and user equipment may send and/or receive information on a suitable time-frequency resource and power configuration according to the (Continued)

channel loss magnitude, thus, the resource allocation is optimized, and the power consumption is saved.

20 Claims, 5 Drawing Sheets

(51) Int. Cl.
*H04W 72/08* (2009.01)
*H04W 52/02* (2009.01)
*H04W 76/04* (2009.01)

(52) U.S. Cl.
CPC ......... *H04W 72/12* (2013.01); *H04W 76/046* (2013.01); *Y02B 60/50* (2013.01)

(56) References Cited

U.S. PATENT DOCUMENTS

| | | | | |
|---|---|---|---|---|
| 2010/0091730 | A1* | 4/2010 | Jang | H04W 72/1242 370/329 |
| 2010/0273499 | A1* | 10/2010 | van Rensburg | H04W 72/1231 455/450 |
| 2011/0274070 | A1* | 11/2011 | Xia | H04W 72/04 370/329 |
| 2016/0308650 | A1* | 10/2016 | Qu | H04J 13/0062 |

FOREIGN PATENT DOCUMENTS

| | | |
|---|---|---|
| CN | 102665284 A | 9/2012 |
| CN | 102739371 A | 10/2012 |
| EP | 1677472 A1 | 7/2006 |

* cited by examiner

METHOD FOR INFORMATION TRANSMISSION, BASE STATION, AND USER EQUIPMENT

CROSS-REFERENCE TO RELATED APPLICATIONS

This application is a continuation of International Patent Application No. PCT/CN2012/084679, filed on Nov. 15, 2012, which is hereby incorporated by reference in its entirety.

TECHNICAL FIELD

Embodiments of the present invention relate to the field of communications and, in particular, to a method for information transmission, a base station, and a user equipment.

BACKGROUND

As an important part of a new generation of information technology, the internet of things (Internet of Things; IOT) refers to a network in which information of the physical world is obtained through deploying various devices having capabilities of certain sense, computation, execution and communication, information transmission, collaboration and processing are realized through the internet, and thereby the interconnections between people and things, and between things and things are achieved. Generally, the first phase of the internet of things is called machine to machine (Machine to Machine; M2M), i.e., to realize free communication between machines. As for a communication network (such as the mobile cellular network), the type of communication service undertaken by the communication network is called a machine type communication (Machine Type Communication; MTC).

In recent years, the long term evolution (Long Term Evolution; LTE) project is the biggest new technology research and development project launched by the $3^{rd}$ generation partnership project (The $3^{rd}$ Generation Partnership Project; 3GPP), this kind of technology with the orthogonal frequency division multiplexing technology (Orthogonal Frequency Division Multiplexing; OFDM)/the multi-input multi-output technology (Multi-Input Multi-Output; MIMO) as the core can provide peak rates of downlink 100 Mbps and uplink 50 Mbps on a 20 MHz spectrum bandwidth, and can improve cell-edge user performance, increase cell capacity and reduce system delay. The performance advantages of the LTE system bring a great deal of benefits, presently, a number of M2M devices can make full use of the advantages of the LTE network, where, one type of M2M devices can bring immediate performance improvement by utilizing the characteristics of high speed and low delay characteristics of the LTE, and the other type of M2M devices is less demanding on connection.

Research on LTE-based low-cost MTC user equipments mainly considers the needed enhancement or optimization for the LTE network and air interfaces aimed at the introduction of MTC devices, where the coverage problem is one of the key issues concerned by operators. For example, an important application of the MTC user equipments is the intelligent instrument which is installed in the basement under the building, or is segregated by the metal shell. In this case, an MTC user equipment will undergo more severe path loss than a common user equipment, for example, the path loss increases 20 dB additionally. The severe path loss will make the power consumption (Power Consumption) of the MTC user equipment increase. Moreover, in consideration of the fact that the MTC user equipments are powered by a battery usually, the increasing of the power consumption will shorten the battery life, which is not good for equipment maintenance.

SUMMARY

With respect to the foregoing problem, embodiments of the present invention provide a method for information transmission, a base station, and a user equipment, so that the power consumption can be reduced, and the resource allocation can be optimized.

The first aspect provides a method for information transmission, including: determining a first enhanced transmission occasion configuration according to a channel loss magnitude with a user equipment, where a time width occupied by an enhanced transmission occasion is greater than a time width occupied by a non-enhanced transmission occasion; transmitting information according to the first enhanced transmission occasion configuration.

In combination with the first aspect, in one implementation method, before the determining the first enhanced transmission occasion configuration according to the channel loss magnitude with the user equipment, further including: determining multiple enhanced transmission occasion configurations, where the multiple enhanced transmission occasion configurations includes the first enhanced transmission occasion configuration.

In combination with the first aspect and the above implementation method, in another implementation method, there is a one-to-one correspondence between the multiple enhanced transmission occasion configurations and multiple channel loss magnitude ranges.

In combination with the first aspect and the above implementation method, in another implementation method, a transmission type corresponding to each channel loss magnitude range in the multiple channel loss magnitude ranges corresponds to at least one information type in multiple information types, where the transmission type indicates a transmission format adopted for the information transmission, and the information type indicates an attribute or a type of the information.

In combination with the first aspect and the above implementation method, in another implementation method, an enhanced transmission occasion configuration corresponding to each channel loss magnitude range in the multiple channel loss magnitude ranges corresponds to at least one information type in the multiple information types.

In combination with the first aspect and the above implementation method, in another implementation method, a transmission type corresponding to each channel loss magnitude range in the multiple channel loss magnitude ranges corresponds to each information type in multiple information types.

In combination with the first aspect and the above implementation method, in another implementation method, an enhanced transmission occasion configuration corresponding to each channel loss magnitude range in the multiple channel loss magnitude ranges corresponds to each information type in the multiple information types.

In combination with the first aspect and the above implementation methods, in another implementation method, the determining the first enhanced transmission occasion configuration according to the channel loss magnitude with the user equipment, includes: determining a first channel loss magnitude range which the channel loss magnitude belongs to in multiple channel loss magnitude ranges; determining the first enhanced transmission occasion configuration corresponding to the first channel loss magnitude range.

In combination with the first aspect and the above implementation methods, in another implementation method, the determining the first enhanced transmission occasion configuration according to the channel loss magnitude with the user equipment, includes: determining a transmission type according to a channel loss magnitude range which the channel loss magnitude belongs to; determining the first enhanced transmission occasion configuration according to the transmission type and an information type of the information.

In combination with the first aspect and the above implementation method, in another implementation method, the transmitting the information according to the first enhanced transmission occasion configuration, includes: performing the information transmission on an enhanced transmission occasion configured by the first enhanced transmission occasion configuration according to the transmission type.

In combination with the first aspect and the above implementation methods, in another implementation method, the method includes: sending the multiple enhanced transmission occasion configurations corresponding to the multiple channel loss magnitude ranges to the user equipment.

In combination with the first aspect and the above implementation method, in another implementation method, the sending the multiple enhanced transmission occasion configurations corresponding to the multiple channel loss magnitude ranges to the user equipment, includes: sending multiple enhanced transmission occasion configuration information to the user equipment through one or multiple signaling of a radio resource control (RRC) broadcast signaling, an RRC dedicated signaling, an RRC multicast signaling, a media access control (MAC) control element (CE) signaling and a physical layer signaling.

In combination with the first aspect and the above implementation method, in another implementation method, the multiple enhanced transmission occasion configuration information includes: each enhanced transmission occasion configuration in the multiple enhanced transmission occasion configurations; or, each enhanced transmission occasion configuration in the multiple enhanced transmission occasion configurations and the number of the multiple enhanced transmission occasion configurations.

In combination with the first aspect and the above implementation methods, in another implementation method, the method includes: sending the transmission type corresponding to each channel loss magnitude range to the user equipment.

In combination with the first aspect and the above implementation method, in another implementation method, the sending the transmission type corresponding to each channel loss magnitude range to the user equipment, includes: sending the transmission type to the user equipment through one or multiple signaling of a radio resource control (RRC) broadcast signaling, an RRC dedicated signaling, an RRC multicast signaling, a media access control (MAC) control element (CE) signaling and a physical layer signaling.

In combination with the first aspect and the above implementation methods, in another implementation method, the method includes: sending the first enhanced transmission occasion configuration determined according to the transmission type to the user equipment.

In combination with the first aspect and the above implementation method, in another implementation method, the sending the first enhanced transmission occasion configuration determined according to the transmission type to the user equipment, includes: sending the first enhanced transmission occasion configuration to the user equipment through an RRC dedicated signaling and/or a physical layer dedicated signaling.

In combination with the first aspect and the above implementation methods, in another implementation method, the enhanced transmission occasion configuration includes at least one of the followings: a time interval of enhanced transmission occasions; a starting time point of an enhanced transmission occasion; a starting point of a frequency resource occupied by an enhanced transmission occasion; a size and/or a location of a frequency resource occupied by an enhanced transmission occasion; a size and/or a location of a time resource occupied by an enhanced transmission occasion; a power configuration adopted for information transmission in an enhanced transmission occasion.

In combination with the first aspect and the above implementation methods, in another implementation method, the channel loss with the user equipment is: a path loss with the user equipment; or a reference signal receiving power (RSRP) measured by the user equipment; or a reference signal receiving quality (RSRQ) measured by the user equipment; or a channel quality information (CQI) determined by the user equipment; or a coverage enhancement expected by the user equipment.

In combination with the first aspect and the above implementation methods, in another implementation method, the transmission type includes at least one of the followings: a number M of repetition transmission; a multiple M of spectrum-spreading transmission; a transmission time interval bundling size M; an aggregation level L; a modulation scheme; an encoding scheme; a random access preamble transmission format; a power configuration.

In combination with the first aspect and the above implementation methods, in another implementation method, the information type belongs to any one of the type sets below: a physical channel type set; a signal type set; a message type set.

The second aspect provides a method for information transmission, the method includes: determining a first enhanced transmission occasion configuration according to a channel loss magnitude with a base station, where a time width occupied by an enhanced transmission occasion is greater than a time width occupied by a non-enhanced transmission occasion; transmitting information according to the first enhanced transmission occasion configuration.

In combination with the second aspect, in one implementation method, before the determining the first enhanced transmission occasion configuration according to the channel loss magnitude with the base station, further including: determining multiple enhanced transmission occasion configurations, where the multiple enhanced transmission occasion configurations includes the first enhanced transmission occasion configuration.

In combination with the second aspect and the above implementation method, in another implementation method, the determining the multiple enhanced transmission occasion configurations includes: receiving multiple enhanced transmission occasion configurations which correspond to multiple channel loss magnitude ranges and are sent by the base station; receiving a transmission type which corresponds to each channel loss magnitude range and is sent by the base station.

In combination with the second aspect and the above implementation method, in another implementation method, there is a one-to-one correspondence between the multiple enhanced transmission occasion configurations and the multiple channel loss magnitude ranges.

In combination with the second aspect and the above implementation method, in another implementation method, a transmission type corresponding to each channel loss magnitude range in the multiple channel loss magnitude ranges corresponds to at least one information type in multiple information types, where the transmission type indicates a transmission format adopted for the information transmission, and the information type indicates an attribute or a type of the information.

In combination with the second aspect and the above implementation method, in another implementation method, an enhanced transmission occasion configuration corresponding to each channel loss magnitude range in the multiple channel loss magnitude ranges corresponds to at least one information type in the multiple information types.

In combination with the second aspect and the above implementation methods, in another implementation method, a transmission type corresponding to each channel loss magnitude range in the multiple channel loss magnitude ranges corresponds to each information type in multiple information types.

In combination with the second aspect and the above implementation method, in another implementation method, an enhanced transmission occasion configuration corresponding to each channel loss magnitude range in the multiple channel loss magnitude ranges corresponds to each information type in the multiple information types.

In combination with the second aspect and the above implementation method, in another implementation method, the determining the multiple enhanced transmission occasion configurations further includes: obtaining the multiple enhanced transmission occasions, which are preconfigured.

In combination with the second aspect and the above implementation method, in another implementation method, the determining the first enhanced transmission occasion configuration according to the channel loss magnitude with the base station, includes: determining a first channel loss magnitude range which the channel loss magnitude belongs to in multiple channel loss magnitude ranges; determining the first enhanced transmission occasion configuration corresponding to the first channel loss magnitude range.

In combination with the second aspect and the above implementation method, in another implementation method, the determining the first enhanced transmission occasion configuration according to the channel loss magnitude with the base station, includes: receiving the first enhanced transmission occasion configuration sent by the base station.

In combination with the second aspect and the above implementation method, in another implementation method, the transmitting the information according to the first enhanced transmission occasion configuration, includes: performing the information transmission on an enhanced transmission occasion configured by the first enhanced transmission occasion configuration according to the transmission type.

In combination with the second aspect and the above implementation method, in another implementation method, the receiving the multiple enhanced transmission occasion configurations which correspond to the multiple channel loss magnitude ranges and are sent by the base station, includes: receiving multiple enhanced transmission occasion configuration information sent by the base station through one or multiple signaling of a radio resource control (RRC) broadcast signaling, an RRC dedicated signaling, an RRC multicast signaling, a media access control (MAC) control element (CE) signaling and a physical layer signaling.

In combination with the second aspect and the above implementation method, in another implementation method, the multiple enhanced transmission occasion configuration information includes: each enhanced transmission occasion configuration in the multiple enhanced transmission occasion configurations; or, each enhanced transmission occasion configuration in the multiple enhanced transmission occasion configurations and the number of the multiple enhanced transmission occasion configurations.

In combination with the second aspect and the above implementation method, in another implementation method, the receiving the transmission type which corresponds to each channel loss magnitude range and is sent by the base station, includes: receiving the transmission type transmitted by the base station through one or multiple signaling of a radio resource control (RRC) broadcast signaling, an RRC dedicated signaling, an RRC multicast signaling, a media access control (MAC) control element (CE) signaling and a physical layer signaling.

In combination with the second aspect and the above implementation methods, in another implementation method, the receiving the first enhanced transmission occasion configuration sent by the base station, includes: receiving the first enhanced transmission occasion configuration transmitted by the base station through an RRC dedicated signaling and/or a physical layer dedicated signaling.

In combination with the second aspect and the above implementation methods, in another implementation method, the enhanced transmission occasion configuration includes at least one of the followings: a time interval of enhanced transmission occasions; a starting time point of an enhanced transmission occasion; a starting point of a frequency resource occupied by an enhanced transmission occasion; a size and/or a location of a frequency resource occupied by an enhanced transmission occasion; a size and/or a location of a time resource occupied by an enhanced transmission occasion; a power configuration adopted for the information transmission in an enhanced transmission occasion.

In combination with the second aspect and the above implementation methods, in another implementation method, the transmission type includes at least one of the followings: a number M of repetition transmission; a multiple M of spectrum-spreading transmission; a transmission time interval cluster size M; an aggregation level L; a modulation scheme; an encoding scheme; a random access preamble transmission format; a power configuration.

In combination with the second aspect and the above implementation methods, in another implementation method, the information type belongs to any one of the type sets below: a physical channel type set; a signal type set; a message type set.

A third aspect provides a base station, including: a first determining module, configured to determine a first enhanced transmission occasion configuration according to a channel loss magnitude with a user equipment, where a time width occupied by an enhanced transmission occasion is greater than a time width occupied by a non-enhanced transmission occasion; a transmission module, configured to transmit information according to the first enhanced transmission occasion configuration.

In combination with the third aspect, in one implementation method, the base station further includes: a second determining module, configured to determine multiple enhanced transmission occasion configurations, where the multiple enhanced transmission occasion configurations includes the first enhanced transmission occasion configuration.

In combination with the third aspect and the above implementation method, in another implementation method, there is a one-to-one correspondence between the multiple enhanced transmission occasion configurations and multiple channel loss magnitude ranges.

In combination with the third aspect and the above implementation method, in another implementation method, a transmission type corresponding to each channel loss magnitude range in the multiple channel loss magnitude ranges corresponds to at least one information type in multiple information types, where the transmission type indicates a transmission format adopted for the information transmission, and the information type indicates an attribute or a type of the information.

In combination with the third aspect and the above implementation method, in another implementation method, an enhanced transmission occasion configuration corresponding to each channel loss magnitude range in the multiple channel loss magnitude ranges corresponds to at least one information type in the multiple information types.

In combination with the third aspect and the above implementation methods, in another implementation method, a transmission type corresponding to each channel loss magnitude range in the multiple channel loss magnitude ranges corresponds to each information type in multiple information types.

In combination with the third aspect and the above implementation method, in another implementation method, an enhanced transmission occasion configuration corresponding to each channel loss magnitude range in the multiple channel loss magnitude ranges corresponds to each information type in the multiple information types.

In combination with the third aspect and the above implementation method, in another implementation method, the first determining module is specifically configured to: determine a first channel loss magnitude range which the channel loss magnitude belongs to in multiple channel loss magnitude ranges; determine the first enhanced transmission occasion configuration corresponding to the first channel loss magnitude range.

In combination with the third aspect and the above implementation methods, in another implementation method, the first determining module is specifically configured to: determine a transmission type according to a channel loss magnitude range which the channel loss magnitude belongs to; determine the first enhanced transmission occasion configuration according to the transmission type and an information type of the information.

In combination with the third aspect and the above implementation methods, in another implementation method, the transmission module is specifically configured to: perform the information transmission on an enhanced transmission occasion configured by the first enhanced transmission occasion configuration according to the transmission type.

In combination with the third aspect and the above implementation methods, in another implementation method, the transmission module is specifically configured to: send the multiple enhanced transmission occasion configurations corresponding to the multiple channel loss magnitude ranges to the user equipment.

In combination with the third aspect and the above implementation method, in another implementation method, the transmission module is specifically configured to: send multiple enhanced transmission occasion configuration information to the user equipment through one or multiple signaling of a radio resource control (RRC) broadcast signaling, an RRC dedicated signaling, an RRC multicast signaling, a media access control (MAC) control element (CE) signaling and a physical layer signaling.

In combination with the third aspect and the above implementation method, in another implementation method, the multiple enhanced transmission occasion configuration information includes: each enhanced transmission occasion configuration in the multiple enhanced transmission occasion configurations; or, each enhanced transmission occasion configuration in the multiple enhanced transmission occasion configurations and the number of the multiple enhanced transmission occasion configurations.

In combination with the third aspect and the above implementation methods, in another implementation method, the transmission module is specifically configured to: send the transmission type corresponding to each channel loss magnitude range to the user equipment.

In combination with the third aspect and the above implementation method, in another implementation method, the transmission module is specifically configured to: send the transmission type to the user equipment through one or multiple signaling of a radio resource control (RRC) broadcast signaling, an RRC dedicated signaling, an RRC multicast signaling, a media access control (MAC) control element (CE) signaling and a physical layer signaling.

In combination with the third aspect and the above implementation methods, in another implementation method, the transmission module is specifically configured to: send the first enhanced transmission occasion configuration determined according to the transmission type to the user equipment.

In combination with the third aspect and the above implementation method, in another implementation method, the transmission module is specifically configured to: send the first enhanced transmission occasion configuration to the user equipment through an RRC dedicated signaling and/or a physical layer dedicated signaling.

The fourth aspect provides a user equipment, including: a first determining module, configured to determine a first enhanced transmission occasion configuration according to a channel loss magnitude with a base station, where a time width occupied by an enhanced transmission occasion is greater than a time width occupied by a non-enhanced transmission occasion; a transmission module, configured to transmit information according to the first enhanced transmission occasion configuration.

In combination with the fourth aspect, in one implementation method, the user equipment further includes: a second determining module, configured to determine multiple enhanced transmission occasion configurations, where the multiple enhanced transmission occasion configurations includes the first enhanced transmission occasion configuration.

In combination with the fourth aspect and the above implementation methods, in another implementation method, the transmission module is specifically configured to: receive multiple enhanced transmission occasion configurations which correspond to multiple channel loss magnitude ranges and are sent by the base station; receive a transmission type which corresponds to each channel loss magnitude range and is sent by the base station.

In combination with the fourth aspect and the above implementation method, in another implementation method, there is a one-to-one correspondence between the multiple enhanced transmission occasion configurations and the multiple channel loss magnitude ranges.

In combination with the fourth aspect and the above implementation method, in another implementation method, a transmission type corresponding to each channel loss magnitude range in the multiple channel loss magnitude ranges corresponds to at least one information type in multiple information types, where the transmission type indicates a transmission format adopted for the information transmission, and the information type indicates an attribute or a type of the information.

In combination with the fourth aspect and the above implementation methods, in another implementation method, an enhanced transmission occasion configuration corresponding to each channel loss magnitude range in the multiple channel loss magnitude ranges corresponds to at least one information type in the multiple information types.

In combination with the fourth aspect and the above implementation methods, in another implementation method, a transmission type corresponding to each channel loss magnitude range in the multiple channel loss magnitude ranges corresponds to each information type in multiple information types one by one.

In combination with the fourth aspect and the above implementation method, in another implementation method, an enhanced transmission occasion configuration corresponding to each channel loss magnitude range in the multiple channel loss magnitude ranges corresponds to each information type in the multiple information types one by one.

In combination with the fourth aspect and the above implementation methods, in another implementation method, the second determining module is specifically configured to: obtain the multiple enhanced transmission occasions, which are preconfigured.

In combination with the fourth aspect and the above implementation methods, in another implementation method, the first determining module is specifically configured to: determine a first channel loss magnitude range which the channel loss magnitude belongs to in multiple channel loss magnitude ranges; determine the first enhanced transmission occasion configuration corresponding to the first channel loss magnitude range.

In combination with the fourth aspect and the above implementation methods, in another implementation method, the transmission module is specifically configured to: receive the first enhanced transmission occasion configuration sent by the base station.

In combination with the fourth aspect and the above implementation methods, in another implementation method, the transmission module is specifically configured to: perform the information transmission on an enhanced transmission occasion configured by the first enhanced transmission occasion configuration according to the transmission type.

In combination with the fourth aspect and the above implementation methods, in another implementation method, the transmission module is specifically configured to: receive multiple enhanced transmission occasion configuration information sent by the base station through one or multiple signaling of a radio resource control (RRC) broadcast signaling, an RRC dedicated signaling, a RRC multicast signaling, a media access control (MAC) control element (CE) signaling and a physical layer signaling.

In combination with the fourth aspect and the above implementation method, in another implementation method, the multiple enhanced transmission occasion configuration information includes: each enhanced transmission occasion configuration in the multiple enhanced transmission occasion configurations; or, each enhanced transmission occasion configuration in the multiple enhanced transmission occasion configurations and the number of the multiple enhanced transmission occasion configurations.

In combination with the fourth aspect and the above implementation methods, in another implementation method, the transmission module is specifically configured to: receive the transmission type sent by the base station through one or multiple signaling of a radio resource control (RRC) broadcast signaling, an RRC dedicated signaling, an RRC multicast signaling, a media access control (MAC) control element (CE) signaling and a physical layer signaling.

In combination with the fourth aspect and the above implementation methods, in another implementation method, the transmission module is specifically configured to: receive the first enhanced transmission occasion configuration sent by the base station through an RRC dedicated signaling and/or a physical layer dedicated signaling.

BRIEF DESCRIPTION OF DRAWINGS

In order to make the technical solutions of embodiments of the present invention more clear, the accompanying drawings used in the description of embodiments of the present invention are briefly described hereunder. Obviously, the described drawings hereunder are merely some embodiments of present invention. For persons skilled in the art, other drawings may be obtained based on these drawings without any creative work.

DESCRIPTION OF EMBODIMENTS

Figure 1:
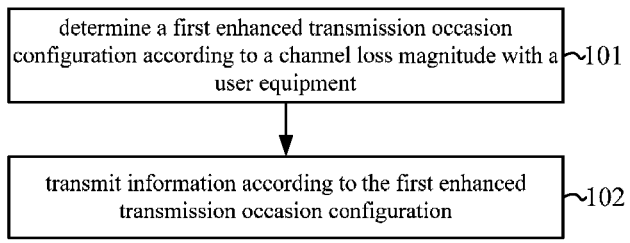
FIG. 1 is a schematic flow chart of a method for information transmission according to an embodiment of the present invention.

In order to make the objectives, technical solutions, and advantages of embodiments of the present invention more clear, the technical solutions in embodiments of the present invention are hereinafter described clearly and comprehensively with reference to the accompanying drawings in embodiments of the present invention. Obviously, the described embodiments are only a part of embodiments of the present invention, rather than all embodiments of the present invention. All the other embodiments obtained by persons of ordinary skill in the art based on embodiments of the present invention without any creative efforts shall fall within the protection scope of the present invention.

It should be understood that technical solutions of the present invention may be applied in various communication systems, for example, the global system of mobile communication (Global System of Mobile communication; GSM) system, the code division multiple access (Code Division Multiple Access; CDMA) system, the wideband code division multiple access (Wideband Code Division Multiple Access; WCDMA) system, the general packet radio service (General Packet Radio Service; GPRS), the long term evolution (Long Term Evolution; LTE) system, the LTE frequency division duplex (Frequency Division Duplex; FDD) system, the LTE time division duplex (Time Division Duplex; TDD) system, and the universal mobile telecommunication system (Universal Mobile Telecommunication System; UMTS), etc.

It should also be understood that, in embodiments of the present invention, the user equipment (User Equipment; UE) may be referred as a terminal (Terminal), a mobile station (Mobile Station; MS), and a mobile terminal (Mobile Terminal), etc., the user equipment may communicate with one or plural core networks via the radio access network (Radio Access Network; RAN), for example, the user equipment may be a mobile phone (or be referred as a "cellular" phone), a computer with a mobile terminal and etc, for example, the user equipment may also be portable, mini, hand-held, computer built-in or vehicle-mounted mobile devices, they exchange voice and/or data with the radio access network.

In embodiments of the present invention, the base station may be a base station (Base Transceiver Station; BTS) in the GSM or CDMA, may also be a base station (NodeB; NB) in the WCDMA, and may also be an evolutional base station (Evolutional NodeB; eNB or e-NodeB) in the LTE, which is not limited in the present invention. In convenience of description, the embodiments hereunder will take a base station (eNB) and a user equipment (UE) as an example for illustration, however, the method described in the present invention may also be similarly applied to communications between other entities (for example, a device and a device).

It should also be understood that, in embodiments of the present invention, the transmitting means sending and/or receiving. The information may be one or more kind of the following physical channels, signals and messages: a physical downlink control channel (PDCCH), an enhanced physical downlink control channel (ePDCCH), a physical random access channel (PRACH), a random access response message, a Msg3 message to acknowledge random access response, a contention resolution message, a system information, a paging message, a physical control format indicator channel (PCFICH), a physical hybrid automatic repeat request indicator channel (PHICH), a unicast physical downlink shared channel (PDSCH), a broadcast or multicast physical downlink shared channel (PDSCH), a physical uplink shared channel (PUSCH), a physical uplink control channel (PUCCH), a common reference signal (CRS), a demodulation reference signal (DMRS), a dedicated reference signal (DRS), a synchronization channel (SCH), a physical broadcast channel (PBCH), etc. Accordingly, the information type may be one or more kind of the information.

FIG. 1 is a schematic flow chart of a method for information transmission according to an embodiment of the present invention. The method of FIG. 1 may be performed by a base station.

101, determine a first enhanced transmission occasion configuration according to a channel loss magnitude with a user equipment, where a time width occupied by an enhanced transmission occasion is greater than a time width occupied by a non-enhanced transmission occasion.

The channel loss magnitude with a user equipment is a metric magnitude of a path loss with the user equipment, may be any magnitude or information which can reflect the communication quality, channel quality, and quality of service (QoS). A specific form may be any one or multiple of: a reference signal receiving power (RSRP) measured by a user equipment; or a reference signal receiving quality (RSRQ) measured by a user equipment; or a channel quality information (CQI) determined by a user equipment; or a coverage enhancement expected by a user equipment.

The channel losses between a base station and different user equipments within the same cell will be different, due to that positions, environments and product realizations of different user equipments are different. Therefore, coverage enhancement magnitudes needed for reliably sending or receiving signals between a base station and different user equipments are different, i.e., the coverage enhancement magnitudes expected by user equipments are different. As for a user equipment with a large channel loss and expecting large coverage enhancement, a coverage enhancement may be realized by manners of sacrificing resources such as repetition, spreading spectrum, transmission time interval bundling (TTI bundling), combining low bit rate coding with low order modulation, etc., that is, enhancing the transmission occasion.

An enhanced transmission occasion includes a size and a location of a time and/or a frequency resource occupied by information transmission of repetition or spread spectrum, and the information is transmitted in the enhanced transmission occasion with M-times repetition transmission or M-multiples spread spectrum modulation in time and/or frequency, a receiving side performs M-multiples information accumulation or M-multiples de-spreading on the signal which is transmitted in one enhanced transmission occasion by M-times repetition or M-multiples spread spectrum modulation, thereby improving the reliability of information transmission. The M may be correspondingly determined according to a channel loss magnitude between a UE and base station, or may be obtained through theoretical computation according to a channel loss magnitude between a UE and base station. In addition, an information enhanced processing method is not limited thereto, for example, for an enhancement of a control channel, the information may be enhanced by performing methods such as an aggregation level or scope of a control channel element (CCE) or an enhanced control channel element (eCCE), a modulation and coding scheme, and a power configuration.

An enhanced transmission occasion configuration can specifically configure a location and a size of a time frequency resource occupied by an enhanced transmission occasion, and a power configuration adopted for an information transmission in an enhanced transmission occasion. Because an enhanced transmission occasion requires more time frequency resources to obtain better coverage and transmission reliability, the time width occupied by an enhanced transmission occasion is greater than the time width occupied by a non-enhanced transmission occasion. The non-enhanced transmission occasion only includes one transmission time interval (TTI) in time, and the information cannot achieve an energy accumulation within multiple TTIs in the non-enhanced transmission occasion. An enhanced transmission occasion includes multiple TTIs in time, and the information can achieve an energy accumulation within multiple TTIs in the enhanced transmission occasion, thereby improving the reliability of information transmission. In general, the repetition transmission, or spectrum-spreading transmission, or TTI bundling of the information is typically performed in accordance with an integer multiple, so the size of the time frequency resource occupied by the enhanced transmission occasion is also usually a multiple of the size of the time frequency resource occupied by the non-enhanced transmission occasion.

Optionally, as an embodiment, an enhanced transmission occasion configuration may include at least one of the followings: a time interval of an enhanced transmission occasion; a starting time point of an enhanced transmission occasion; a starting point of a frequency resource occupied by an enhanced transmission occasion; a size and/or location of a frequency resource occupied by an enhanced transmission occasion; a size and/or location of a time resource occupied by an enhanced transmission occasion; a power configuration adopted for information transmission in an enhanced transmission occasion.

102, transmit information according to the first enhanced transmission occasion configuration.

Information with an enhanced processing, for example, the information with M-times repetition or M-multiples spread spectrum modulation, is transmitted on the time frequency resource configured by the first enhanced transmission occasion configuration, thereby realizing a reliable information transmission and a coverage enhancement. An information enhanced processing method is not limited thereto, for example, for a control channel, the information may be enhanced by performing methods such as an aggregation level or a scope of a control channel element (CCE) or an enhanced control channel element (eCCE), a modulation and coding scheme, and a power configuration. Meanwhile, since the first enhanced transmission occasion configuration is determined according to the channel loss magnitude, more time frequency resources are used when the channel loss magnitude is higher, and fewer time frequency resources are utilized when the channel loss magnitude is lower, so that the time frequency resource is reasonably allocated, and the power consumption is saved.

Figure 2:
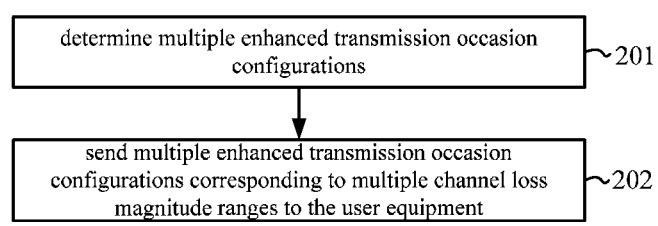
FIG. 2 is a schematic flow chart of a method for information transmission according to another embodiment of the present invention.

FIG. 2 is a schematic flow chart of a method for information transmission according to another embodiment of the present invention. The method of FIG. 2 is performed by a base station. FIG. 2 is a more specific embodiment of FIG. 1, and gives a specific method for determining an enhanced transmission occasion configuration corresponding to a channel loss magnitude and for informing the enhanced transmission occasion configuration.

201, determine multiple enhanced transmission occasion configurations, where the multiple enhanced transmission occasion configurations includes a first enhanced transmission occasion configuration.

Multiple enhanced transmission occasion configurations may be configured for a base station through a system predefined manner. Specifically, corresponding relationships among multiple enhanced transmission occasion configurations and multiple channel loss magnitude ranges and transmission types may be predefined. For example, there is a one-to-one correspondence between multiple enhanced transmission occasion configurations and multiple channel loss magnitude ranges; a transmission type corresponding to each channel loss magnitude range in multiple channel loss magnitude ranges corresponds to at least one information type in multiple information types; an enhanced transmission occasion configuration corresponding to each channel loss magnitude range in multiple channel loss magnitude ranges corresponds to at least one information type in multiple information types; there is a one-to-one correspondence between a transmission type corresponding to each channel loss magnitude range in multiple channel loss magnitude ranges and each information type in multiple information types; and there is a one-to-one correspondence between an enhanced transmission occasion configuration corresponding to each channel loss magnitude range in multiple channel loss magnitude ranges and each information type in multiple information types. A transmission type indicates a transmission format adopted for information transmission, and an information type indicates an attribute or a type of information.

A division of channel loss magnitude ranges may also be predefined by the system; multiple channel loss magnitudes may be set in a large magnitude range, so as to divide a large magnitude range into multiple channel loss magnitude ranges. For example, 5 dB, 10 dB, 15 dB are taken from a magnitude range from 0 dB to 20 dB, the magnitude range is divided into ranges from 0 dB to 5 dB, from 6 dB to 10 dB, from 11 dB to 15 dB, and from 16 dB to 20 dB. It should be understood that, a method for dividing channel loss magnitude ranges in the present invention is not limited thereto.

Optionally, as an embodiment, Table 1 illustrates corresponding relationships among channel loss magnitude ranges, transmission types, and enhanced transmission occasion configurations. There is a one-to-one correspondence between channel loss magnitude ranges and transmission types, and there is a one-to-one correspondence between transmission types and enhanced transmission occasion configurations, thus, there is a one-to-one correspondence between multiple enhanced transmission occasion configurations and multiple channel loss magnitude ranges.

TABLE 1

Corresponding relationships among channel loss magnitude ranges, transmission types, and enhanced transmission occasion configurations

| Channel loss magnitude range | Transmission type | Enhanced transmission occasion configuration |
| --- | --- | --- |
| Range 1: channel loss magnitude ≤ A dB | M1-times repetition transmission, and/or adopt a spreading factor with a length of M1 | Enhanced transmission occasion configuration 1 |
| Range 2: A dB < channel loss magnitude ≤ B dB | M2-times repetition transmission, and/or adopt a spreading factor with a length of M2 | Enhanced transmission occasion configuration 2 |
| Range 3: B dB < channel loss magnitude | M3-times repetition transmission, and/or adopt a spreading factor with a length of M3 | Enhanced transmission occasion configuration 3 |

The range division in Table 1 is merely an example, and may not be limited to three ranges. The number of repetition transmission and/or the spreading factors M1, M2 and M3 in the transmission types are different with each other, and M1<M2<M3. A spreading factor is a spreading multiple for performing spectrum-spreading modulation. A transmission type is not limited to the repetition transmission and spectrum-spreading modulation, and may also include one or multiple the followings: TTI bundling, a spreading code index, an aggregation level or scope of a control channel element (CCE) or an enhanced control channel element (eCCE), a modulation and coding scheme, a power configuration, etc. It should be noted that a part or all of the contents included in a transmission type corresponding to a channel loss magnitude range may be included in an enhanced transmission occasion configuration corresponding to the channel loss magnitude range. If all contents included in a transmission type corresponding to a channel loss magnitude range are entirely included in an enhanced transmission occasion configuration corresponding to the channel loss magnitude range, a transmission type may not be defined in fact; at this point, only a corresponding relationship between the channel loss magnitude range and the enhanced transmission occasion configuration exists.

After multiple channel loss magnitude ranges are determined, a transmission type which can ensure the reliability of information transmission may be determined according to a weight of each channel loss magnitude range. Where, the weight of the channel loss magnitude range may be determined according to a boundary magnitude or an average magnitude of the channel loss magnitude range, for example, the weight of the range from 6 dB to 10 dB may be 6 dB, 10 dB or 8 dB. It should be understood that the determining the weight of the channel loss magnitude range is not limited to the method. The greater the weight of the channel loss magnitude range, the more number of repetition transmission of the corresponding transmission type, and/or the longer length of the spreading factor, and/or the higher aggregation level, and/or the larger size of the TTI bundling, etc., and vice versa.

In the case without considering the information type, the size and the location of the time frequency resource needs to be occupied can be known according to the transmission type which can ensure the reliability of information transmission. Moreover, an appropriate power configuration is determined in combination with the weight of the channel loss magnitude range. An enhanced transmission occasion is determined according to the size and the location of the time frequency resource as well as the power configuration and, thus, an enhanced transmission occasion configuration is determined.

Optionally, as another embodiment, considering the information type, the information transmission of different information types may apply the same corresponding relationship among the channel loss magnitude range, the transmission type and the enhanced transmission occasion configuration. Table 2 illustrates that the information transmission of an information type x, an information type y and an information type z adopts the same corresponding relationship among the channel loss magnitude range, the transmission type and the enhanced transmission occasion configuration.

TABLE 2

Corresponding relationships among channel loss magnitude ranges, information types, transmission types, and enhanced transmission occasion configurations

| Channel loss magnitude range | Information type | Transmission type | Enhanced transmission occasion configuration |
| --- | --- | --- | --- |
| Range 1: channel loss magnitude ≤ A dB | Information type x<br>Information type y<br>Information type z | Transmission type 1 | Enhanced transmission occasion configuration 1 |
| Range 2: A dB < channel loss magnitude ≤ B dB | Information type x<br>Information type y<br>Information type z | Transmission type 2 | Enhanced transmission occasion configuration 2 |
| Range 3: B dB < channel loss magnitude | Information type x<br>Information type y<br>Information type z | Transmission type 3 | Enhanced transmission occasion configuration 3 |

It should be understood that the range division in Table 2 is merely an example, and may not be limited to three ranges. The information type x, the information type y, and the information type z are merely an exemplary division, and the number of information types is not limited to three. Extendably, at least one information type in multiple information types may also have corresponding relationships. That is, a transmission type corresponding to each channel loss magnitude range in multiple channel loss magnitude ranges corresponds to at least one information type in multiple information types; an enhanced transmission occasion configuration corresponding to each channel loss magnitude range in multiple channel loss magnitude ranges corresponds to at least one information type in multiple information types. It should be noted that a part of or all contents included in a transmission type corresponding to a channel loss magnitude range may be included in an enhanced transmission occasion configuration corresponding to the channel loss magnitude range. If all contents included in a transmission type corresponding to a channel loss magnitude range are entirely included in an enhanced transmission occasion configuration corresponding to the channel loss magnitude range, a transmission type may not be defined in fact; at this point, only a corresponding relationship between the channel loss magnitude range and the enhanced transmission occasion configuration exists.

The information type may belong to any one of the type sets below: a physical channel type set; a signal type set; a message type set. The physical channel type set may include: a physical downlink control channel (PDCCH), an enhanced physical downlink control channel (ePDCCH), a physical random access channel (PRACH), a physical control format indicator channel (PCFICH), a physical hybrid automatic repeat request indicator channel (PHICH), a unicast physical downlink shared channel (PDSCH), a broadcast or a multicast physical downlink shared channel (PDSCH), a physical uplink shared channel (PUSCH), a physical uplink control channel (PUCCH), a synchronization channel (SCH), a physical broadcast channel (PBCH), etc. The signal type set may include: a common reference signal (CRS), a demodulation reference signal (DMRS), a dedicated reference signal (DRS), etc. The message type set may include: a random access response message, a Msg3 message to acknowledge random access response, a contention resolution message, a system information, a paging message, etc.

In this embodiment, the corresponding relationship among a channel loss magnitude range, a transmission type and an enhanced transmission occasion is the same with the corresponding relationship of the three in Table 1. Reference may also be made to Table 1 for the method for determining the corresponding relationship, which will not be repeated herein.

Optionally, as another embodiment, considering the information type, different information types may apply different corresponding relationships among channel loss magnitude ranges, transmission types and enhanced transmission occasion configurations. Table 3 illustrates the information transmission of an information type x, information type y and information type z adopts different corresponding relationship among channel loss magnitude ranges, transmission types and enhanced transmission occasion configurations.

TABLE 3

Corresponding relationships among channel loss magnitude ranges, information types, transmission types, and enhanced transmission occasion configurations

| Channel loss magnitude range | Information type | Transmission type | Enhanced transmission occasion configuration |
|---|---|---|---|
| Range 1: Channel loss magnitude ≤ A dB | Information type x | Transmission type x1 | Enhanced transmission occasion configuration x1 |
| Range 2: A dB < Channel loss magnitude ≤ B dB | Information type x | Transmission type x2 | Enhanced transmission occasion configuration x2 |
| Range 3: B dB < Channel loss magnitude | Information type x | Transmission type x3 | Enhanced transmission occasion configuration x3 |
| Range 1: Channel loss magnitude ≤ A dB | Information type y | Transmission type y1 | Enhanced transmission occasion configuration y1 |
| Range 2: A dB < Channel loss magnitude ≤ B dB | Information type y | Transmission type y2 | Enhanced transmission occasion configuration y2 |
| Range 3: B dB < Channel loss magnitude | Information type y | Transmission type y3 | Enhanced transmission occasion configuration y3 |
| Range 1: Channel loss magnitude ≤ A dB | Information type z | Transmission type z1 | Enhanced transmission occasion configuration z1 |
| Range 2: A dB < Channel loss magnitude ≤ B dB | Information type z | Transmission type z2 | Enhanced transmission occasion configuration z2 |
| Range 3: B dB < Channel loss magnitude | Information type z | Transmission type z3 | Enhanced transmission occasion configuration z3 |

It should be understood that the range division in Table 3 is merely an example, and may not be limited to three ranges. The information type x, the information type y, and the information type z are merely an exemplary division, and the number of information types is not limited to three. A transmission type corresponding to each channel loss magnitude range in multiple channel loss magnitude ranges corresponds to each information type in multiple information types; an enhanced transmission occasion configuration corresponding to each channel loss magnitude range in multiple channel loss magnitude ranges corresponds to each information type in multiple information types. It should be noted that a part or all of the contents included in a transmission type corresponding to a channel loss magnitude range may be included in an enhanced transmission occasion configuration corresponding to the channel loss magnitude range. If all of the contents included in a transmission type corresponding to a channel loss magnitude range are entirely included in an enhanced transmission occasion configuration corresponding to the channel loss magnitude range, a transmission type may not be defined in fact; at this point, only a corresponding relationship between the channel loss magnitude range and the enhanced transmission occasion configuration exists.

The information type may belong to any one of the type sets below: a physical channel type set; a signal type set; a message type set. The physical channel type set may include: a physical downlink control channel (PDCCH), an enhanced physical downlink control channel (ePDCCH), a physical random access channel (PRACH), a physical control format indicator channel (PCFICH), a physical hybrid automatic repeat request indicator channel (PHICH), a unicast physical downlink shared channel (PDSCH), a broadcast or a multicast physical downlink shared channel (PDSCH), a physical uplink shared channel (PUSCH), a physical uplink control channel (PUCCH), a synchronization channel (SCH), a physical broadcast channel (PBCH), etc. The signal type set may include: a common reference signal (CRS), a demodulation reference signal (DMRS), a dedicated reference signal (DRS), etc. The message type set may include: a random access response message, a Msg3 message to acknowledge random access response, a contention resolution message, a system information, a paging message, etc.

In this embodiment, each information type has a specific corresponding relationship among a channel loss magnitude range, a transmission type and an enhanced transmission occasion. A system needs to respectively and separately configure a corresponding relationship among a channel loss magnitude range, a transmission type and an enhanced transmission occasion for different information types. There is still the one-to-one correspondence between the transmission types and the enhanced transmission occasion configurations. However, the same channel loss magnitude range may correspond to different transmission types and enhanced transmission occasion configurations.

202, send multiple enhanced transmission occasion configurations corresponding to multiple channel loss magnitude ranges to the user equipment.

After determining a corresponding relationship between multiple channel loss magnitude ranges and multiple enhanced transmission occasion configurations, sending the corresponding relationship to a user equipment. Specifically, multiple enhanced transmission occasion configurations corresponding to multiple channel loss magnitude ranges may be sent to the user equipment, and a transmission type corresponding to each channel loss magnitude range may be further sent to a user equipment, so that a corresponding relationship among a channel loss magnitude range, a transmission type and an enhanced transmission occasion configuration can be established at a UE side.

More specifically, an actual sending means may be: sending multiple enhanced transmission occasion configuration information and/or transmission types to a user equipment through one or multiple of a radio resource control (RRC) broadcast signaling (such as a system information block (SIB) or a master information block (MIB)), an RRC dedicated signaling, an RRC multicast signaling, a media access control (MAC) control element (CE) signaling and a physical layer signaling. A corresponding relationship among a channel loss magnitude range, a transmission type and an information type may be determined through a sending sequence, or through a label.

Optionally, as an embodiment, in the case of without considering a information type, the pseudo code hereunder illustrates providing an enhanced transmission occasion (Enhanced Transmission Occasion; ETO) configuration to a UE through an RRC broadcast signaling:

```
ETO-ConfigCommon::= {SEQUENCE (SIZE (1.. ETONumber)) OF
ETOInfo
    ETOInfo ::={SEQUENCE
    a time interval of enhanced transmission occasions T
    a starting time point of a first enhanced transmission occasion
    a starting point of a frequency resource occupied by an enhanced
transmission occasion
    a size and/or a location of a frequency resource occupied by an
enhanced transmission occasion
    a size and/or a location of a time resource occupied by an enhanced
transmission occasion
    a power configuration adopted for the information transmission in an
enhanced transmission occasion
        }
}
```

In the pseudo code, the ETO-ConfigCommon does not indicate the information type, i.e. the information type is not taken into consideration in this embodiment. It can be also understood as that all the information types may apply the same corresponding relationship among a channel loss magnitude range, a transmission type and an enhanced transmission occasion configuration. The ETONumber indicates the number of enhanced transmission occasions, equivalently, indicates the number of enhanced transmission occasion configurations, i.e. in the process of informing multiple enhanced transmission occasion configurations to a UE by a base station, the number of multiple enhanced transmission configurations is also informed to the UE simultaneously. In the ETOInfo, a time interval between multiple enhanced transmission occasions, a starting time point and time length of each enhanced transmission occasion, a starting point and a size of a frequency resource occupied by each enhanced transmission occasion and a power configuration adopted for information transmission in each enhanced transmission occasion are specifically configured. ETOInfo may include any one or multiple of the above configuration items. Similarly, a transmission type may also be sent to the UE, therefore, the one-to-one correspondence as shown in Table 1 in Step 201 is established at the UE side.

Optionally, as another embodiment, in the case of considering the information type, the pseudo code hereunder illustrates configuring the same enhanced transmission occasion to the information type x, the information type y and the information type z through an RRC broadcast signaling:

```
ETO-ConfigCommon_x_y_z::= {SEQUENCE (SIZE (1.. ETONumber))
OF ETOInfo
    ETOInfo ::={SEQUENCE
    a time interval of enhanced transmission occasions T
    a starting time point of a first enhanced transmission occasion
    a starting point of a frequency resource occupied by an enhanced
transmission occasion
    a size and/or a location of a frequency resource occupied by an
enhanced transmission occasion
    a size and/or a location of a time resource occupied by an enhanced
transmission occasion
    a power configuration adopted for the information transmission in an
enhanced transmission occasion
        }
}
```

In the pseudo code, the ETO-ConfigCommon indicates the information type x, the information type y, and the information type z, i.e. the information type is taken into consideration in this embodiment, and the same corresponding relationship among a channel loss magnitude range, a transmission type and an enhanced transmission occasion configuration is configured for different information types. The ETONumber indicates the number of enhanced transmission occasions, equivalently, indicates the number of enhanced transmission occasion configurations, i.e. in the process of informing multiple enhanced transmission occasion configurations to a UE by a base station, the number of multiple enhanced transmission configurations is also informed to the UE simultaneously. In the ETOInfo, a time interval between multiple enhanced transmission occasions, a starting time point and time length of each enhanced transmission occasion, a starting point and a size of a frequency resource occupied by each enhanced transmission occasion and a power configuration adopted for information transmission in each enhanced transmission occasion are specifically configured. ETOInfo may include any one or multiple of the above configuration items. Similarly, a transmission type may also be sent to the UE, therefore, the one-to-one correspondence as shown in Table 2 in Step 201 is established at the UE side.

Optionally, as another embodiment, in the case of considering the information type, the following three sections of pseudo code respectively illustrate configuring an enhanced transmission occasion to the information type x, the information type y and the information type z, respectively, through an RRC broadcast signaling:

```
ETO-ConfigCommon_x::= {SEQUENCE (SIZE (1.. ETONumber)) OF
ETOInfo
    ETOInfo ::={SEQUENCE
    a time interval of enhanced transmission occasions T
    a starting time point of a first enhanced transmission occasion
    a starting point of a frequency resource occupied by an enhanced
transmission occasion
    a size and/or a location of a frequency resource occupied by an
enhanced transmission occasion
    a size and/or a location of a time resource occupied by an
enhanced transmission occasion
    a power configuration adopted for the information transmission in an
enhanced transmission occasion
        }
}
ETO-ConfigCommon_y::= {SEQUENCE (SIZE (1.. ETONumber)) OF
ETOInfo
    ETOInfo ::={SEQUENCE
    a time interval of enhanced transmission occasions T
    a starting time point of a first enhanced transmission occasion
    a starting point of a frequency resource occupied by an enhanced
transmission occasion
    a size and/or a location of a frequency resource occupied by an
enhanced transmission occasion
    a size and/or a location of a time resource occupied by an enhanced
transmission occasion
    a power configuration adopted for the information transmission in an
enhanced transmission occasion
        }
}
ETO-ConfigCommon_z::= {SEQUENCE (SIZE (1.. ETONumber)) OF
ETOInfo
    ETOInfo ::={SEQUENCE
    a time interval of enhanced transmission occasions T
    a starting time point of a first enhanced transmission occasion
    a starting point of a frequency resource occupied by an enhanced
transmission occasion
    a size and/or a location of a frequency resource occupied by an
enhanced transmission occasion
    a size and/or a location of a time resource occupied by an enhanced
transmission occasion
    a power configuration adopted for the information transmission in an
enhanced transmission occasion
        }
}
```

In three sections of the pseudo code, the ETO-Config-Common indicates the information type x, the information type y and the information type, z respectively, i.e. the information type is taken into consideration in this embodiment, and different corresponding relationships among a channel loss magnitude range, a transmission type and an enhanced transmission occasion configuration is configured for multiple different information types. The ETONumber indicates the number of enhanced transmission occasions, equivalently, indicates the number of enhanced transmission occasion configurations, i.e. in the process of informing multiple enhanced transmission occasion configurations to a UE by a base station, the number of multiple enhanced transmission configurations is also informed to the UE simultaneously. In the ETOInfo, a time interval between multiple enhanced transmission occasions, a starting time point and time length of each enhanced transmission occasion, a starting point and a size of a frequency resource occupied by each enhanced transmission occasion and a power configuration adopted for information transmission in each enhanced transmission occasion are specifically configured. ETOInfo may include any one or multiple of the above configuration items. Similarly, a transmission type may also be sent to the UE, therefore, the one-to-one correspondence as shown in Table 3 in Step 201 is established at the UE side.

Therefore, according to the method for information transmission in the present invention, a corresponding relationship among a channel loss magnitude range, a transmission type and an enhanced transmission occasion can be configured at a base station side through a system predefined manner. Different channel loss magnitude ranges correspond to different enhanced transmission occasion configurations, more time frequency resources and greater powers are used in a higher channel loss magnitude range to ensure a reliable information transmission, and fewer time frequency resources and smaller powers are used in a lower channel loss magnitude range, so that the time frequency resource allocation is optimized, the complexity of system implementation is reduced, and the power consumption is saved.

Figure 3:
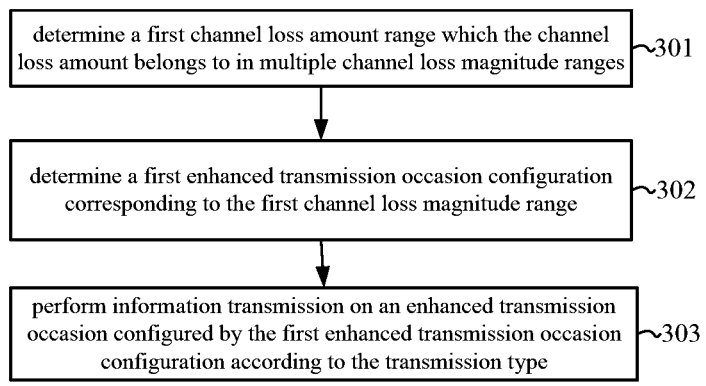
FIG. 3 is a schematic flow chart of a method for information transmission according to another embodiment of the present invention.

FIG. 3 is a schematic flow chart of a method for information transmission according to another embodiment of the present invention. The method of FIG. 3 is performed by a base station. FIG. 3 is a more specific embodiment of FIG. 2, and gives a specific method for determining a first enhanced transmission occasion and performing information transmission.

301, determine a first channel loss magnitude range which the channel loss magnitude belongs to in multiple channel loss magnitude ranges.

Firstly, determine a channel loss magnitude with a UE, the specific determining method is not limited in embodiments of the present invention, the channel loss magnitude may be obtained by a base station through determining, and may also be obtained by a UE through determining and reporting to the base station, for example, a reference signal receiving power (RSRP) measured by the UE; or a reference signal receiving quality (RSRQ) measured by the UE; or a channel quality information (CQI) determined by the UE; or a coverage enhancement expected by the UE, etc.

After determining the channel loss magnitude, the base station determines a first channel loss magnitude range including the channel loss magnitude in multiple channel loss magnitude ranges predefined by the system. For example, in combination with division examples of the channel loss magnitude ranges in step 201, assuming that the channel loss magnitude is 3 dB, then the first channel loss magnitude range ranges from 0 dB to 5 dB.

302, determine a first enhanced transmission occasion configuration corresponding to the first channel loss magnitude range.

The first enhanced transmission occasion configuration corresponding to the first channel loss magnitude range is determined according to a corresponding relationship among a channel loss magnitude range, a transmission type, an information type and an enhanced transmission occasion configuration in step 201. The information type is a built-in attribute or type of to-be-transmitted information.

Optionally, as an embodiment, in the case of without considering the information type, the first enhanced transmission occasion configuration may be determined with reference to the corresponding relationships in Table 1 in step 201. For example, the first channel loss magnitude range is: AdB<channel loss magnitude≤B dB, accordingly, the first enhanced transmission occasion configuration is the enhanced transmission occasion configuration 2.

Optionally, as another embodiment, in the case of considering the information type, the first enhanced transmission occasion configuration may be determined with reference to the corresponding relationships in Table 2 in step 201. The corresponding relationships among channel loss magnitude ranges, transmission types and enhanced transmission occasion configurations in Table 1 and Table 2 may be the same. That is, different information types may be configured with the same enhanced transmission occasion. For example, for the different information types x and y of to-be-transmitted information, the first channel loss magnitude range is channel loss magnitude≤A dB, accordingly, the first enhanced transmission occasion configuration is the enhanced transmission occasion configuration 1.

Optionally, as another embodiment, in the case of considering the information type, the first enhanced transmission occasion configuration may be determined with reference to the corresponding relationships in Table 3 in step 201. That is, different information types may be configured with different enhanced transmission occasions, respectively. Therefore, before determining an enhanced transmission occasion, besides determining a first channel loss magnitude range, it also needs to determine an information type of to-be-transmitted information. The information type may be determined by the base station, and may also be reported to the base station through the UE. For example, it is determined that the information type of the to-be-transmitted information is x, the first channel loss magnitude range is: BdB<channel loss magnitude, accordingly, the first enhanced transmission occasion configuration is the enhanced transmission occasion configuration x3, if the information type of the to-be-transmitted information is y, accordingly, the first enhanced transmission occasion configuration is the enhanced transmission occasion configuration y3.

303, perform information transmission on an enhanced transmission occasion configured by the first enhanced transmission occasion configuration according to the transmission type.

Firstly, the base station determines the transmission type corresponding to the first enhanced transmission occasion according to the correspondence in the step 302. Then, transmit the enhancement-processed information on the time frequency resource configured by the first enhanced transmission occasion configuration, for example, the information is transmitted on a resource of M-multiples time width or of M-multiples frequency width via M-times repetition, or the M-multiples spread spectrum modulation, or the M-multiples TTI bundling, thereby realizing a reliable information transmission and a coverage enhancement. The information enhanced processing method is not limited thereto, for example, for a control channel, the information enhancement may be performed through methods such as an aggregation level or a scope of a control channel element (CCE) or an enhanced control channel element (eCCE), a modulation and coding scheme, and power configuration. Different enhanced processing methods of the information may be interpreted as different transmission types.

Meanwhile, since a first enhanced transmission occasion configuration is determined according to a channel loss magnitude, more time frequency resources are used when channel loss magnitude is higher, and fewer time frequency resources are utilized when channel loss magnitude is lower, so that a time frequency resource is reasonably allocated, and power consumption is saved.

Figure 4:
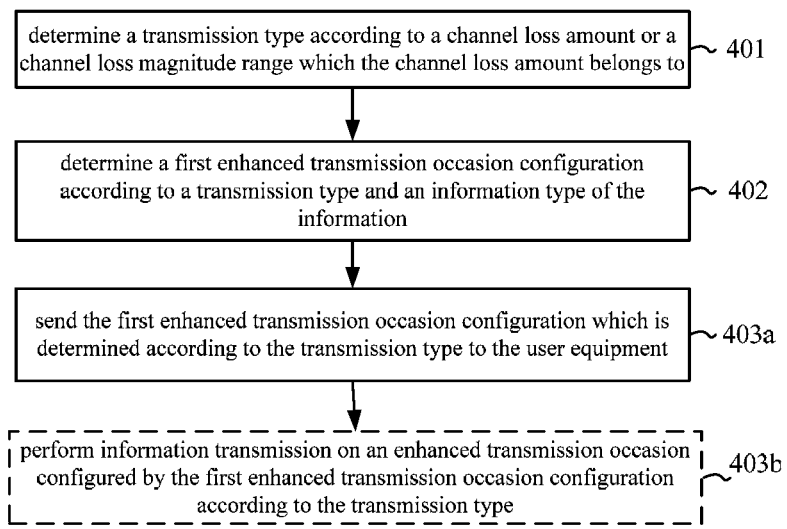
FIG. 4 is a schematic flow chart of a method for information transmission according to another embodiment of the present invention.

FIG. 4 is a schematic flow chart of a method for information transmission according to another embodiment of the present invention. The method of FIG. 4 is performed by a base station. FIG. 4 is a more specific embodiment of FIG. 1, and gives a specific method for determining a first enhanced transmission occasion through a non-system predefined manner.

401, determine a transmission type according to a channel loss magnitude or a channel loss magnitude range which the channel loss magnitude belongs to.

Firstly, determine a channel loss magnitude with a UE, the specific determining method is not limited in embodiments of the present invention, the channel loss magnitude may be obtained by a base station through determining, and may also be obtained by a UE through determining and reporting to the base station, for example, a reference signal receiving power (RSRP) measured by the UE; or a reference signal receiving quality (RSRQ) measured by the UE; or a channel quality information (CQI) determined by the UE; or a coverage enhancement expected by the UE, etc.

After determining the channel loss magnitude, the base station determines, according to the channel loss magnitude size, a number M of repetition transmission, or a multiple M of spectrum-spreading, or a TTI bundling size, or a CCE/eCCE aggregation level, or a modulation and coding scheme, or a power configuration, or a spreading code index, which can ensure a reliable information transmission. That is, determine a suitable transmission type.

Or, multiple channel loss magnitude ranges may be divided, and determine a range which the channel loss magnitude belongs to. A number M of repetition transmission, or a multiple M of spectrum-spreading, or a TTI bundling size, or a CCE/eCCE aggregation level, or a modulation and coding scheme, or a power configuration, or a spreading code index, which can ensure a reliable information transmission, is determined according to the weight of the channel loss magnitude range. That is, determine a suitable transmission type. Where, the weight of the channel loss magnitude range may be determined according to a boundary magnitude or an average magnitude of the channel loss magnitude range, for example, the weight of the range from 6 dB to 10 dB may be 6 dB, 10 dB or 8 dB. It should be understood that the determining the weight of the channel loss magnitude range is not limited to the method. The greater weight of the channel loss magnitude range, the more the number of repetition transmission of the corresponding transmission type, and/or the longer the length of the spreading factor, and/or the higher the aggregation level, and/or the larger the size of the TTI bundling, etc., and vice versa.

402, determine a first enhanced transmission occasion configuration according to a transmission type and an information type of the information.

A size of a time frequency resource occupied by the information transmission may be determined according to the transmission type. A location of the time frequency resource occupied by the information transmission may be determined according to an information type of the information. In addition, a coverage enhancement needed for the transmission may also be determined according to a channel loss magnitude, therefore, a power needed for the information transmission is determined. The first enhanced transmission occasion configuration may be determined through one or multiple of the methods. That is, the enhanced transmission occasion configuration includes at least one of the followings: a time interval of enhanced transmission occasions; a starting time point of an enhanced transmission occasion; a starting point of a frequency resource occupied by an enhanced transmission occasion; a size and/or a location of a frequency resource occupied by an enhanced transmission occasion; a size and/or location of a time resource occupied by an enhanced transmission occasion; a power configuration adopted for the information transmission in an enhanced transmission occasion.

The information type may belong to any one of the type sets below: a physical channel type set; a signal type set; a message type set. The physical channel type set may include: a physical downlink control channel (PDCCH), an enhanced physical downlink control channel (ePDCCH), a physical random access channel (PRACH), a physical control format indicator channel (PCFICH), a physical hybrid automatic repeat request indicator channel (PHICH), a unicast physical downlink shared channel (PDSCH), a broadcast or a multicast physical downlink shared channel (PDSCH), a physical uplink shared channel (PUSCH), a physical uplink control channel (PUCCH), a synchronization channel (SCH), a physical broadcast channel (PBCH), etc. The signal type set may include: a common reference signal (CRS), a demodulation reference signal (DMRS), a dedicated reference signal (DRS), etc. The message type set may include: a random access response message, a Msg3 message to acknowledge random access response, a contention resolution message, a system information, a paging message, etc.

403a, send the first enhanced transmission occasion configuration which is determined according to the transmission type to the user equipment.

The first enhanced transmission occasion configuration is sent to the user equipment through an RRC dedicated signaling and/or a physical layer dedicated signaling. For example, taking the RRC dedicated signaling as an example, in the case of without considering the information type, the first enhanced transmission occasion configuration may be sent in the form of being represented by the pseudo code hereunder:

---

ETO-ConfigDedicated::= {SEQUENCE
    a time interval of enhanced transmission occasions T
    a starting time point of a first enhanced transmission occasion
    a starting point of a frequency resource occupied by an enhanced transmission occasion
    a size and/or a location of a frequency resource occupied by an enhanced transmission occasion
    a size and/or a location of a time resource occupied by an enhanced transmission occasion
    a power configuration adopted for the information transmission in an enhanced transmission occasion
    }

---

Optionally, in the case of considering the information type, reference may be made to the embodiment of step 202 in FIG. 2 for the pseudo code format of the RRC dedicated signaling, which will not be repeated herein.

403*b*, perform information transmission on an enhanced transmission occasion configured by the first enhanced transmission occasion configuration according to the transmission type.

Transmit the enhancement-processed information on the time frequency resource configured by the first enhanced transmission occasion configuration, for example, information is transmitted on a resource of M-multiples time width or of M-multiples frequency width via M-times repetition, or M-multiples spread spectrum modulation, or M-multiples TTI bundling, thereby realizing a reliable information transmission and a coverage enhancement. The information enhanced processing method is not limited thereto, for example, for a control channel, the information enhancement may be performed through methods such as an aggregation level or a scope of a control channel element (CCE) or an enhanced control channel element (eCCE), a modulation and coding scheme, and power configuration. Different enhanced processing methods of the information may be interpreted as different transmission types.

The methods for implementing two steps 403*a* and 403*b* include methods as follows: perform 403*a*, but does not perform 403*b*; or, does not perform 403*a*, but perform 403*b*; or, perform 403*a*, and perform 403*b*. The implementations of these two steps have no particular order.

Since the first enhanced transmission occasion configuration is determined according to the channel loss magnitude, more time frequency resources are used when the channel loss magnitude is higher, and fewer time frequency resources are utilized when the channel loss magnitude is lower, so that the time frequency resource is reasonably allocated, and the power consumption is saved.

Figure 5:
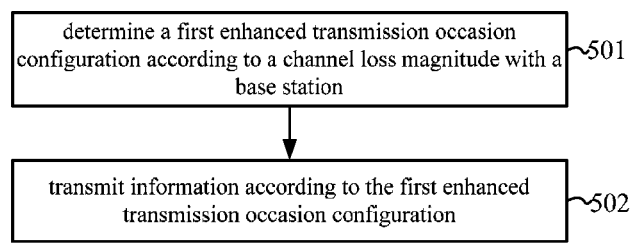
FIG. 5 is a schematic flow chart of a method for information transmission according to another embodiment of the present invention.

FIG. 5 is a schematic flow chart of a method for information transmission according to another embodiment of the present invention. The method of FIG. 5 is performed by a user equipment.

501, determine a first enhanced transmission occasion configuration according to a channel loss magnitude with a base station, where a time width occupied by an enhanced transmission occasion is greater than a time width occupied by a non-enhanced transmission occasion.

The channel loss magnitude with a base station is a metric magnitude of a path loss with the base station, may be any magnitude or information which can reflect the communication quality, channel quality, and quality of service (QoS). The specific form may be any one or multiple of: a reference signal receiving power (RSRP) measured by the user equipment; or a reference signal receiving quality (RSRQ) measured by the user equipment; or a channel quality information (CQI) determined by the user equipment; or a coverage enhancement expected by the user equipment.

The channel losses between a base station and different user equipments within the same cell will be different, due to that the positions, the environments and the product realizations of different user equipments are different. Therefore, coverage enhancement magnitudes needed for reliably sending or receiving signals between a base station and different user equipments are different, i.e., the coverage enhancement magnitudes expected by user equipments are different. As for a user equipment with large channel loss and expecting large coverage enhancement, a coverage enhancement may be realized by manners of sacrificing resources such as repeating, spreading spectrum, TTI bundling, combining low bit rate coding with low order modulation, etc., that is, enhancing the transmission occasion.

An enhanced transmission occasion includes a size and a location of a time and/or a frequency resource occupied by a information transmission of repetition or spread spectrum or a TTI bundling, and the information is transmitted in the enhanced transmission occasion with M-times repetition transmission or M-multiples spread spectrum modulation in time and/or frequency, a receiving side performs M-multiples information accumulation or M-multiples de-spreading on the signal which is transmitted in one enhanced transmission occasion by M-times repetition or M-multiples spread spectrum modulation, thereby improving the reliability of information transmission. An information enhanced processing method is not limited thereto, for example, for an enhancement of a control channel, the information may be enhanced by performing through methods such as an aggregation level or scope of a control channel element (CCE) or an enhanced control channel element (eCCE), a modulation and coding scheme, and a power configuration.

An enhanced transmission occasion configuration can specifically configure a location and a size of a time frequency resource occupied by an enhanced transmission occasion, and a power configuration adopted for an information transmission in an enhanced transmission occasion. Because an enhanced transmission occasion requires more time frequency resources to obtain better coverage and transmission reliability, the time width occupied by an enhanced transmission occasion is greater than the time width occupied by a non-enhanced transmission occasion. The non-enhanced transmission occasion only includes one transmission time interval (TTI) in time, and the information cannot achieve an energy accumulation within multiple TTIs in the non-enhanced transmission occasion. An enhanced transmission occasion includes multiple TTIs in time, and the information can achieve an energy accumulation within multiple TTIs in the enhanced transmission occasion, thereby improving the reliability of information transmission. In general, the repetition transmission, or spectrum-spreading transmission, or TTI bundling of the information is typically performed in accordance with an integer multiple, so the size of the time frequency resource occupied by the enhanced transmission occasion is also usually a multiple of the size of the time frequency resource occupied by the non-enhanced transmission occasion.

Optionally, as an embodiment, an enhanced transmission occasion configuration may include at least one of the followings: a time interval of enhanced transmission occasions; a starting time point of an enhanced transmission occasion; a starting point of a frequency resource occupied by an enhanced transmission occasion; a size and/or a location of a frequency resource occupied by an enhanced transmission occasion; a size and/or location of a time resource occupied by an enhanced transmission occasion; a power configuration adopted for the information transmission in an enhanced transmission occasion.

502, transmit information according to the first enhanced transmission occasion configuration.

Firstly, the UE needs to determine a transmission type corresponding to the first enhanced transmission occasion. Then, the UE transmits, for example, information on the time frequency resource configured by the first enhanced transmission occasion configuration according to the transmission type, via the M-times repetition or the M-multiples spread spectrum modulation, thereby realizing a reliable information transmission and a coverage enhancement. The information enhanced processing method is not limited thereto, for example, for a control channel, the information enhancement may be performed through methods such as an aggregation level or a scope of a control channel element (CCE) or an enhanced control channel element (eCCE), a modulation and coding scheme, and power configuration. Meanwhile, since the first enhanced transmission occasion configuration is determined according to the channel loss magnitude, more time frequency resources are used when the channel loss magnitude is higher, and fewer time frequency resources are utilized when the channel loss magnitude is lower, so that the time frequency resource is reasonably allocated, and the power consumption is saved.

Figure 6:
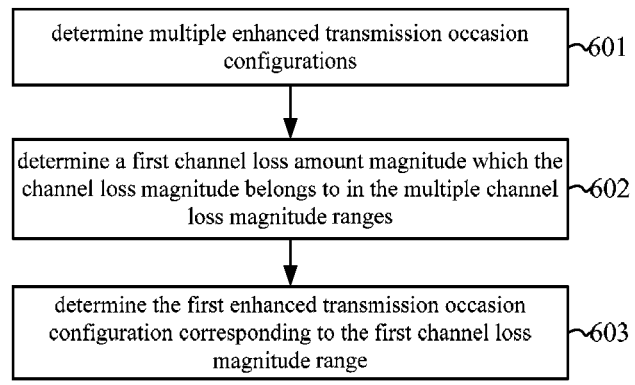
FIG. 6 is a schematic flow chart of a method for information transmission according to another embodiment of the present invention.

FIG. 6 is a schematic flow chart of a method for information transmission according to another embodiment of the present invention. The method of FIG. 6 is performed by a UE. FIG. 6 is a more specific embodiment of FIG. 5, and gives a specific method for determining an enhanced transmission occasion configuration corresponding to a channel loss magnitude in FIG. 5.

601, determine multiple enhanced transmission occasion configurations, where the multiple enhanced transmission occasion configurations includes a first enhanced transmission occasion configuration.

Before determining the first enhanced transmission occasion configuration according to the channel loss magnitude with the base station in step 501 of FIG. 5 above, multiple enhanced transmission occasion configurations may be determined at the UE side firstly, there are two methods: obtaining multiple enhanced transmission occasion configurations which are preconfigured; or receiving multiple enhanced transmission occasion configurations which correspond to multiple channel loss magnitude ranges and are sent by the base station.

Optionally, as an embodiment, multiple enhanced transmission occasion configurations may be configured for the UE through the system predefined manner. Specifically, corresponding relationships among multiple enhanced transmission occasion configurations and multiple channel loss magnitude ranges and transmission types may be predefined. For example, there is a one-to-one correspondence between multiple enhanced transmission occasion configurations and multiple channel loss magnitude ranges; a transmission type corresponding to each channel loss magnitude range in multiple channel loss magnitude ranges corresponds to at least one information type in multiple information types; an enhanced transmission occasion configuration corresponding to each channel loss magnitude range in multiple channel loss magnitude ranges corresponds to at least one information type in multiple information types; there is a one-to-one correspondence between a transmission type corresponding to each channel loss magnitude range in multiple channel loss magnitude ranges and each information type in multiple information types; and there is a one-to-one correspondence between an enhanced transmission occasion configuration corresponding to each channel loss magnitude range in multiple channel loss magnitude ranges and each information type in multiple information types. The UE may obtain multiple enhanced transmission occasion configurations predefined by the system locally. The transmission type indicates a transmission format adopted for the information transmission, and the information type indicates an attribute or a type of the information. The information type may belong to any one of the type sets below: a physical channel type set; a signal type set; a message type set. The physical channel type set may include: a physical downlink control channel (PDCCH), an enhanced physical downlink control channel (ePDCCH), a physical random access channel (PRACH), a physical control format indicator channel (PCFICH), a physical hybrid automatic repeat request indicator channel (PHICH), a unicast physical downlink shared channel (PDSCH), a broadcast or a multicast physical downlink shared channel (PDSCH), a physical uplink shared channel (PUSCH), a physical uplink control channel (PUCCH), a synchronization channel (SCH), a physical broadcast channel (PBCH), etc. The signal type set may include: a common reference signal (CRS), a demodulation reference signal (DMRS), a dedicated reference signal (DRS), etc. The message type set may include: a random access response message, a Msg3 message to acknowledge random access response, a contention resolution message, a system information, a paging message, etc.

The division of channel loss magnitude ranges may also be predefined by the system, multiple channel loss magnitudes may be set in a large magnitude range, so as to divide the large magnitude range into multiple channel loss magnitude ranges. For example, 5 dB, 10 dB, 15 dB are taken from a magnitude range from 0 dB to 20 dB, the magnitude range is divided into ranges from 0 dB to 5 dB, from 6 dB to 10 dB, from 11 dB to 15 dB, and from 16 dB to 20 dB. It should be understood that, the method for dividing channel loss magnitude ranges in the present invention is not limited thereto.

For the corresponding relationships, reference may be made to embodiments in step 201 and, in particular, to Table 1, Table 2 and Table 3, which will not be repeated herein.

Optionally, as another embodiment, receive multiple enhanced transmission occasion configurations which correspond to multiple channel loss magnitude ranges and are sent by the base station, and/or receive transmission types which correspond to each channel loss magnitude range and are sent by the base station, so that a corresponding relationship among a channel loss magnitude range, a transmission type and an enhanced transmission occasion configuration can be established at a UE side.

Specifically, the actual receiving means may be: receiving multiple enhanced transmission occasion configuration information and/or transmission types sent by the base station through one or multiple of signaling of a radio resource control (RRC) broadcast signaling (such as a system information block (SIB) or a master information block (MIB)), an RRC dedicated signaling, an RRC multicast signaling, a media access control (MAC) control element (CE) signaling and a physical layer signaling. The corresponding relationship among the channel loss magnitude range, the transmission type and the information type may be determined through a sending sequence, or through a label.

More specifically, for example, receive the enhanced transmission occasion configuration sent by the base station through the RRC dedicated signaling, for the pseudo code formats of the RRC dedicated signaling, reference may be made to the several pseudo code formats of the RRC signaling in step 202 in FIG. 2, which will not be repeated herein.

602, determine a first channel loss magnitude range which the channel loss magnitude belongs to in the multiple channel loss magnitude ranges;

Firstly, determine a channel loss magnitude with the base station, the specific determining method is not limited in embodiments of the present invention. After determining the channel loss magnitude, the UE determines a first channel loss magnitude range including the channel loss magnitude in multiple channel loss magnitude ranges. For example, in combination with division examples of the channel loss magnitude ranges in step 601, assuming that the channel loss magnitude is 3 dB, then the first channel loss magnitude range ranges from 0 dB to 5 dB.

603, determine the first enhanced transmission occasion configuration corresponding to the first channel loss magnitude range.

The first enhanced transmission occasion configuration corresponding to the first channel loss magnitude range is determined according to a corresponding relationship among a channel loss magnitude range, a transmission type, an information type and an enhanced transmission occasion configuration in step 601. The information type is a built-in attribute or catalogue of to-be-transmitted information.

Reference may be made to step 302 in FIG. 3 for the specific determining method, which will not be repeated herein.

Therefore, according to the method for information transmission in the present invention, a corresponding relationship among a channel loss magnitude range, a transmission type and an enhanced transmission occasion can be configured at a UE side through a system predefined manner or a base station informing manner. Different channel loss magnitude ranges correspond to different enhanced transmission occasion configurations, more time frequency resources and greater powers are used in a higher channel loss magnitude range to ensure a reliable information transmission, and fewer time frequency resources and smaller powers are used in a lower channel loss magnitude range, so that the time frequency resource allocation is optimized, the complexity of system implementation is reduced, and the power consumption is saved.

Figure 7:
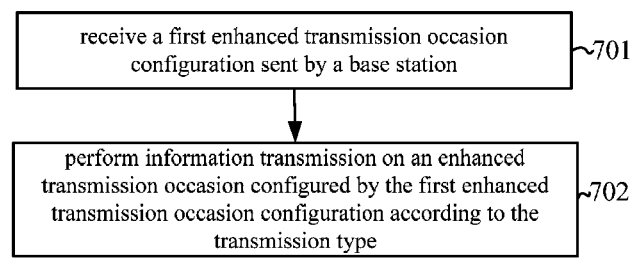
FIG. 7 is a schematic flow chart of a method for information transmission according to another embodiment of the present invention.

FIG. 7 is a schematic flow chart of a method for information transmission according to another embodiment of the present invention. The method of FIG. 7 is performed by a UE. FIG. 7 is another more specific embodiment of FIG. 5.

701, receive a first enhanced transmission occasion configuration sent by a base station.

Firstly, determine a channel loss magnitude with a base station, the specific determining method is not limited in embodiments of the present invention, the channel loss magnitude may be obtained by a base station through determining, and may also be obtained by a UE through determining and reporting to the base station, for example, a reference signal receiving power (RSRP) measured by the UE; or a reference signal receiving quality (RSRQ) measured by the UE; or a channel quality information (CQI) determined by the UE; or a coverage enhancement expected by the UE, etc.

Receive the first enhanced transmission occasion configuration sent by the base station, for the method for determining a first enhanced transmission occasion configuration by the base station, reference may be made to FIG. 3 or FIG. 4, which will not be repeated herein.

Specifically, the first enhanced transmission occasion configuration sent by the base station may be received through an RRC dedicated signaling and/or a physical layer dedicated signaling. Taking the RRC dedicated signaling as an example, in the case of without considering the information type, the first enhanced transmission occasion configuration may be represented in the form of the pseudo code hereunder:

ETO-ConfigDedicated::=
  {SEQUENCE
    a time interval of enhanced transmission occasions T
    a starting time point of a first enhanced transmission occasion
    a starting point of a frequency resource occupied by an enhanced transmission occasion
    a size and/or a location of a frequency resource occupied by an enhanced transmission occasion -continued a size and/or a location of a time resource occupied by an enhanced transmission occasion
    a power configuration adopted for the information transmission in an enhanced transmission occasion
  }

Optionally, in the case of considering the information type, reference may be made to the embodiment of step 202 in FIG. 2 for the pseudo code format of the RRC dedicated signaling, which will not be repeated herein.

702, perform information transmission on an enhanced transmission occasion configured by the first enhanced transmission occasion configuration according to the transmission type.

Firstly, the UE may determine the transmission type through a manner of receiving the base station informing, and then transmit the enhancement-processed information on the time frequency resource configured by the first enhanced transmission occasion configuration, for example, the information is transmitted on a resource of M-multiples time width or of M-multiples frequency width via M-times repetition, or M-multiples spread spectrum modulation, or M-multiples TTI bundling, thereby realizing a reliable information transmission and a coverage enhancement. The information enhanced processing method is not limited thereto, for example, for a control channel, the information enhancement may be performed through methods such as an aggregation level or a scope of a control channel element (CCE) or an enhanced control channel element (eCCE), a modulation and coding scheme, and power configuration.

Since the first enhanced transmission occasion configuration is determined according to the channel loss magnitude, more time frequency resources are used when the channel loss magnitude is higher, and fewer time frequency resources are utilized when the channel loss magnitude is lower, so that the time frequency resource is reasonably allocated, and the power consumption is saved.

Figure 8:
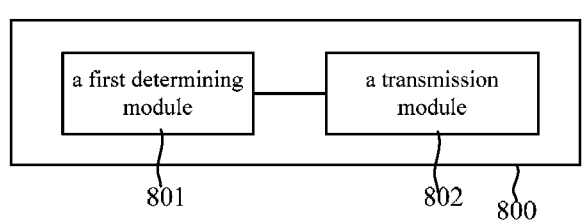
FIG. 8 is a schematic block diagram of a base station according to an embodiment of the present invention.

FIG. 8 is a schematic block diagram of a base station according to an embodiment of the present invention. As shown in FIG. 8, this embodiment provides a base station 800 which may specifically perform each step of the embodiment in FIG. 1, and will not be repeated herein. The base station 800 according to this embodiment may specifically include a first determining module 801, and a transmission module 802.

The first determining module 801 is configured to determine a first enhanced transmission occasion configuration according to a channel loss magnitude with a user equipment, where a time width occupied by an enhanced transmission occasion is greater than a time width occupied by a non-enhanced transmission occasion; the transmission module 802 is configured to transmit information according to the first enhanced transmission occasion configuration.

Figure 9:
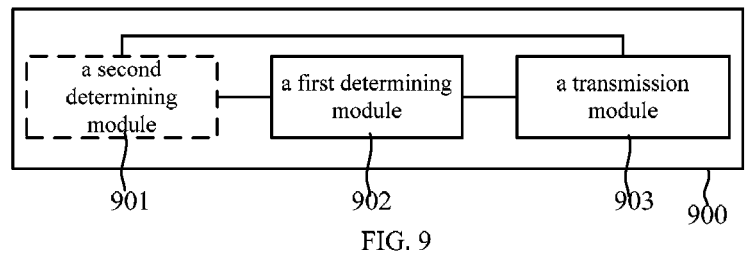
FIG. 9 is a schematic block diagram of a base station according to another embodiment of the present invention.

FIG. 9 is a schematic block diagram of a base station according to another embodiment of the present invention. As shown in FIG. 9, this embodiment provides a base station 900 which may specifically perform each step of the embodiments in the FIG. 2, FIG. 3 and FIG. 4, and will not be repeated herein. The base station 900 according to this embodiment may specifically include a second determining module 901, a first determining module 902 and a transmission module 903.

The second determining module 901 is configured to determine multiple enhanced transmission occasion configurations;

the first determining module 902 is configured to determine a first enhanced transmission occasion configuration according to a channel loss magnitude with a user equipment;

the transmission module 903 is configured to transmit information according to the first enhanced transmission occasion configuration.

The second determining module 901 is optional, the base station 900 needs the second determining module 901 when performing the method in the FIG. 2 or FIG. 3, and the base station 900 does not need the second determining module 901 when performing the method in the FIG. 4.

Optionally, as an embodiment, the base station 900 performs the method in the FIG. 2. The second determining module is specifically configured to configure multiple enhanced transmission occasion configurations for the base station through a system predefined manner. Specifically, corresponding relationships among multiple enhanced transmission occasion configurations and multiple channel loss magnitude ranges and transmission types may be predefined. For example, there is a one-to-one correspondence between multiple enhanced transmission occasion configurations and multiple channel loss magnitude ranges; a transmission type corresponding to each channel loss magnitude range in multiple channel loss magnitude ranges corresponds to at least one information type in multiple information types; an enhanced transmission occasion configuration corresponding to each channel loss magnitude range in multiple channel loss magnitude ranges corresponds to at least one information type in multiple information types; there is a one-to-one correspondence between a transmission type corresponding to each channel loss magnitude range in multiple channel loss magnitude ranges and each information type in multiple information types; and there is a one-to-one correspondence between an enhanced transmission occasion configuration corresponding to each channel loss magnitude range in multiple channel loss magnitude ranges and each information type in multiple information types. The transmission type indicates a transmission format adopted for the information transmission, and the information type indicates an attribute or a type of the information. Reference is made to Table 1, Table 2, and Table 3 of step 201 in the FIG. 2 for a specific corresponding relationship, which will not be repeated herein.

The transmission module 903 is specifically configured to transmit multiple enhanced transmission occasion configurations corresponding to multiple channel loss magnitude ranges to the user equipment. After determining a corresponding relationship between multiple channel loss magnitude ranges and multiple enhanced transmission occasion configurations, the corresponding relationship is sent to the user equipment. Specifically, multiple enhanced transmission occasion configurations corresponding to multiple channel loss magnitude ranges may be sent to the user equipment, and a transmission type corresponding to each channel loss magnitude range may also be sent to the user equipment, so that a corresponding relationship among a channel loss magnitude range, a transmission type and an enhanced transmission occasion configuration can be established at a UE side.

More specifically, an actual sending means may be: sending multiple enhanced transmission occasion configuration information and transmission types to the user equipment through one or multiple of a radio resource control (RRC) broadcast signaling (such as a system information block (SIB) or a master information block (MIB)), an RRC dedicated signaling, an RRC multicast signaling, a media access control (MAC) control element (CE) signaling and a physical layer signaling. The corresponding relationship among the channel loss magnitude range, the transmission type and the information type may be determined through a sending sequence, or through a label. For a specific sending method, reference may be made to, but not limited to, the example of RRC broadcast signaling provided in step 202 of FIG. 2.

Optionally, as another embodiment, the base station 900 performs the method in the FIG. 3.

The first determining module 902 is specifically configured to: determine a first channel loss magnitude range which the channel loss magnitude belongs to in multiple channel loss magnitude ranges; determine a first enhanced transmission occasion configuration corresponding to the first channel loss magnitude range.

Firstly, determine a channel loss magnitude with a UE, the specific determining method is not limited in embodiments of the present invention, the channel loss magnitude may be obtained by a base station through determining, and may also be obtained by a UE through determining and reporting to the base station, for example, a reference signal receiving power (RSRP) measured by the UE; or a reference signal receiving quality (RSRQ) measured by the UE; or a channel quality information (CQI) determined by the UE; or a coverage enhancement expected by the UE, etc. The transmission module 903 may be configured to receive the channel loss magnitude reported by the UE. After determining the channel loss magnitude, the base station determines a first channel loss magnitude range including the channel loss magnitude in multiple channel loss magnitude ranges predefined by the system. The first enhanced transmission occasion configuration corresponding to the first channel loss magnitude range may be determined according to a corresponding relationship predefined in the second determining module 901, specifically, reference may be made to the method of step 302 in the FIG. 3, and will not be repeated herein.

The transmission module 903 is specifically configured to: perform information transmission on an enhanced transmission occasion configured by the first enhanced transmission occasion configuration according to the transmission type. Transmitting the enhancement-processed information on the time frequency resource configured by the first enhanced transmission occasion configuration, for example, the information is transmitted on a resource of M-multiples time width or of M-multiples frequency width via M-times repetition, or M-multiples spread spectrum modulation, or M-multiples TTI bundling, thereby realizing a reliable information transmission and a coverage enhancement. The information enhanced processing method is not limited thereto, for example, for a control channel, the information enhancement may be performed through methods such as an aggregation level or a scope of a control channel element (CCE) or an enhanced control channel element (eCCE), a modulation and coding scheme, and power configuration. Different enhanced processing methods of the information may be interpreted as different transmission types.

Optionally, as another embodiment, the base station 900 performs the method in the FIG. 4.

Specifically, a channel loss magnitude sent by a UE may be received by the transmission module 903 firstly. The first determining module 902 is specifically configured to: determine a transmission type according to a channel loss magnitude or a channel loss magnitude range which the channel loss magnitude belongs to; determine a first enhanced transmission occasion configuration according to a transmission type and an information type of the information. Reference may be made to step 401 and step 402 in the FIG. 4 for the specific determining method, which will not be repeated herein. Then the transmission module 903 is specifically configured to, send the first enhanced transmission occasion configuration which is determined according to the transmission type to the user equipment, and/or perform information transmission on an enhanced transmission occasion configured by the first enhanced transmission occasion configuration according to the transmission type. Reference may be made to step 403a and step 403b in the FIG. 4 for the specific method.

Figure 10:
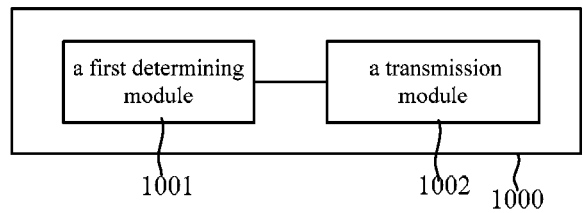
FIG. 10 is a schematic block diagram of a user equipment according to an embodiment of the present invention.

FIG. 10 is a schematic block diagram of a user equipment according to an embodiment of the present invention. As shown in FIG. 10, this embodiment provides a user equipment 1000 which may specifically perform each step of the embodiments in the FIG. 5, and will not be repeated herein. The user equipment 1000 according to this embodiment may specifically include a first determining module 1001 and a transmission module 1002.

The first determining module 1001 is configured to determine a first enhanced transmission occasion configuration according to a channel loss magnitude with a base station, where a time width occupied by an enhanced transmission occasion is greater than a time width occupied by a non-enhanced transmission occasion; the transmission module 1002 is configured to transmit information according to the first enhanced transmission occasion configuration.

Figure 11:
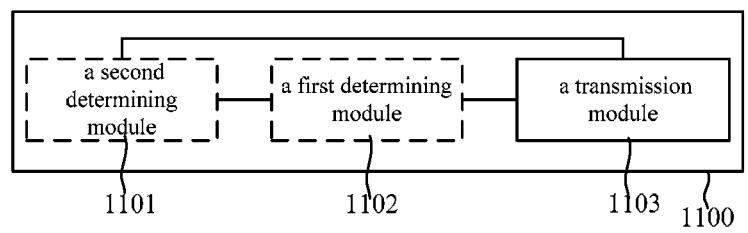
FIG. 11 is a schematic block diagram of a user equipment according to another embodiment of the present invention.

FIG. 11 is a schematic block diagram of a user equipment according to another embodiment of the present invention. As shown in FIG. 11, this embodiment provides a user equipment 1100 which may specifically perform each step of the embodiments in the FIG. 6 or FIG. 7, and will not be repeated herein. The user equipment 1100 according to this embodiment may specifically include a second determining module 1101, a first determining module 1102 and a transmission module 1103.

The second determining module 1101 is configured to determine multiple enhanced transmission occasion configurations;

the first determining module 1102 is configured to determine a first enhanced transmission occasion configuration according to a channel loss magnitude with a user equipment;

the transmission module 1103 is configured to transmit information according to the first enhanced transmission occasion configuration.

The second determining module 1101 and the first determining module 1102 are optional, the user equipment 1100 needs the second determining module 1101 or the first determining module 1102 when performing the method in the FIG. 6, and the user equipment 1100 does not need the second determining module 1101 and the first determining module 1102 when performing the method in the FIG. 7.

Optionally, as an embodiment, the user equipment 1100 performs the method in the FIG. 6.

The second determining module 1101 is configured to determine multiple enhanced transmission occasion configurations, and may configure the multiple enhanced transmission occasion configurations for the UE through a system predefined manner. Specifically, corresponding relationships among multiple enhanced transmission occasion configurations and multiple channel loss magnitude ranges and transmission types may be predefined. For example, there is a one-to-one correspondence between multiple enhanced transmission occasion configurations and multiple channel loss magnitude ranges; a transmission type corresponding to each channel loss magnitude range in multiple channel loss magnitude ranges corresponds to at least one information type in multiple information types; an enhanced transmission occasion configuration corresponding to each channel loss magnitude range in multiple channel loss magnitude ranges corresponds to at least one information type in multiple information types; there is a one-to-one correspondence between a transmission type corresponding to each channel loss magnitude range in multiple channel loss magnitude ranges and each information type in multiple information types; and there is a one-to-one correspondence between an enhanced transmission occasion configuration corresponding to each channel loss magnitude range in multiple channel loss magnitude ranges and each information type in multiple information types. The first determining module 1102 is specifically configured to obtain the predefined plurality of enhanced transmission occasion configurations at the second determining module 1101. The transmission type indicates a transmission format adopted for the information transmission, and the information type indicates an attribute or a type of the information.

Or, multiple enhanced transmission occasion configurations corresponding to multiple channel loss magnitude ranges sent by a base station may be received by the transmission module 1103, and transmission types which correspond to each channel loss magnitude range and are sent by a base station may be received, so that a corresponding relationship among a channel loss magnitude range, a transmission type and an enhanced transmission occasion configuration can be established at a UE side. Reference may be made to step 601 in the FIG. 6 for the specific receiving manner, which will not be repeated herein.

The first determining module 1102 is specifically configured to: determine a first channel loss magnitude range which the channel loss magnitude belongs to in the multiple channel loss magnitude ranges; determine the first enhanced transmission occasion configuration corresponding to the first channel loss magnitude range. Reference may be made to step 602 and step 603 in the FIG. 6 for the specific method, which will not be repeated herein.

Optionally, as another embodiment, the user equipment 1100 performs the method in the FIG. 7.

A channel loss magnitude determined by the user equipment may be sent to a base station by the transmission module 1103. The transmission module 1103 may also be configured to receive a first enhanced transmission occasion configuration sent by a base station. Reference may be made to step 701 in the FIG. 7 for the specific method, which will not be repeated herein.

Finally, the transmission module 1103 may perform information transmission on an enhanced transmission occasion configured by the first enhanced transmission occasion configuration according to the transmission type. Reference may be made to step 702 in the FIG. 7 for the specific method, which will not be repeated herein.

Therefore, the user equipment in the present invention can make the range which each channel loss magnitude belongs to correspond to each enhanced transmission occasion configuration, so that the user equipment may send and/or receive information according to the range which the channel loss magnitude between the user equipment and the base station belongs to, therefore, the resource allocation is optimized, and the power consumption is saved.

Figure 12:
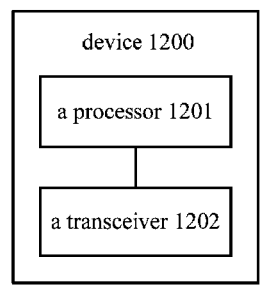
FIG. 12 is a schematic block diagram of a base station according to an embodiment of the present invention.

FIG. 12 is a schematic block diagram of a base station according to an embodiment of the present invention. As shown in FIG. 12, this embodiment provides a base station 1200 which may specifically perform each step of embodiments in the FIG. 1~FIG. 4, FIG. 8 and FIG. 9, and will not be repeated herein. The base station 1200 according to this embodiment may specifically include a processor 1201 and a transceiver 1202.

The processor 1201 is configured to determine a first enhanced transmission occasion configuration according to a channel loss magnitude with a user equipment. The transceiver 1202 is configured to transmit information according to the first enhanced transmission occasion configuration determined by the processor 1201.

Optionally, as an embodiment, the processor 1201 may also be configured to determine multiple enhanced transmission occasion configurations, reference may be made to step 201 in the FIG. 2 for the specific determining method, and will not be repeated herein. The transceiver 1202 may also be configured to send the multiple enhanced transmission occasion configurations and/or transmission types determined by the processor 1201, reference may be made to step 202 in the FIG. 2 for the specific sending method, and will not be repeated herein.

Optionally, as another embodiment, the transceiver 1202 may also be configured to receive a channel loss magnitude with a user equipment, the processor 1201 may also be configured to determine a first channel loss magnitude range which the channel loss magnitude received by the transceiver 1202 belongs to in the multiple channel loss magnitude ranges; determine a first enhanced transmission occasion configuration corresponding to the first channel loss magnitude range.

Optionally, as another embodiment, the processor 1201 may also be configured to determine a transmission type according to a channel loss magnitude range which the channel loss magnitude belongs to; determine a first enhanced transmission occasion configuration according to the transmission type and an information type of the information. The transceiver 1201 may be specifically configured to perform information transmission on an enhanced transmission occasion configured by the first enhanced transmission occasion configuration according to the transmission type.

Figure 13:
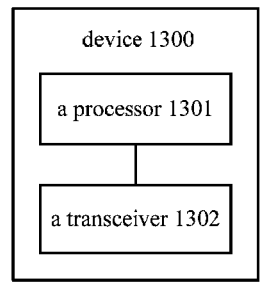
FIG. 13 is a schematic block diagram of a user equipment according to an embodiment of the present invention.

FIG. 13 is a schematic block diagram of a user equipment according to an embodiment of the present invention. As shown in FIG. 13, this embodiment provides a user equipment 1300 which may specifically perform each step of the embodiments in the FIG. 5~FIG. 7, FIG. 10 and FIG. 11, and will not be repeated herein. The user equipment 1300 according to this embodiment may specifically include a processor 1301 and a transceiver 1302.

The processor 1301 is configured to determine a first enhanced transmission occasion configuration according to a channel loss magnitude with a base station. The transceiver 1302 is configured to transmit information according to the first enhanced transmission occasion configuration determined by the processor 1301.

Optionally, as an embodiment, the processor 1301 may also be configured to determine multiple enhanced transmission occasion configurations, reference may be made to step 601 in the FIG. 6 for the specific determining method, and will not be repeated herein. The transceiver 1302 may also be configured to receive multiple enhanced transmission occasion configurations and/or transmission types sent by the base station, reference may be made to step 601 in the FIG. 6 for the specific receiving method, and will not be repeated herein. The processor 1301 is also specifically configured to: determine a first channel loss magnitude range which the channel loss magnitude belongs to in the multiple channel loss magnitude ranges; determine the first enhanced transmission occasion configuration corresponding to the first channel loss magnitude range.

Optionally, as another embodiment, the transceiver 1302 may also be configured to: send a channel loss magnitude with a base station to the base station; receive a first enhanced transmission occasion configuration sent by a base station; perform information transmission on an enhanced transmission occasion configured by the first enhanced transmission occasion configuration according to the transmission type.

Ordinary persons skilled in the art may realize that, based on the embodiments disclosed in this text, the described units and algorithm procedures in each example can be achieved by the electronic hardware, the computer software, or a combination of both, in order to clearly explain the interchangeability of the hardware and software, the composition and procedure of each example have been generally described in the illustrations according to the function. Whether these functions should be executed in the way of hardware or software, it depends on prescribed applications and designed restriction conditions for the technical solutions. The professional technical persons may adopt different methods in each prescribed application so as to realize a described function, but this kind of realization should not be considered as going beyond the scope of present invention.

Persons skilled in the art may clearly know that, for the convenience of a concise description, reference may be made to the corresponding processes in the foregoing method embodiments in which specific functioning processes of a system, a device, and units are described above. It is unnecessary to go into details herein.

It should be understood that the system, the device, and the method disclosed in some embodiments of the present invention may be achieved by other means, for example, the device embodiments described above are merely schematic, for example, the division for the described units is merely a division by logical function, and there may be extra division methods in practical implementations; for example, multiple units or components may be combined or integrated into another system, or some features may be ignored or may not be executed. In addition, the displayed or discussed couplings between each other, or direct couplings, or communication links may be via some interfaces, indirect couplings or communication links of devices or units, and may also be electrical, mechanical or other forms of connections.

The units described as separating components may be or may not be physically separated, the components displayed as units may be or may not be physical units, i.e. may locate in one place or be distributed to multiple network units. Part of or all of the units may be selected according to the practical needs so as to realize the purpose of the technical solutions of embodiments of the present invention.

In addition, each functional unit as described in embodiments of the present invention may be integrated into one processing unit, or each unit may separately and physically exist, or two or more than two units may be integrated into one unit. The foregoing integrated units may be achieved in the form of hardware, and may also be achieved in the form of software functional units.

If the integrated units are achieved in the form of software functional units and are sold and used as independent products, they can be stored into a computer readable storage medium. Based on this understanding, technical solutions of the present invention in essence, or the parts with contribution to the prior art, or parts of or all of the technical solutions, may be embodied in the form of software products. The computer software products are stored into a storage medium which includes a number of instructions for enabling one computer device (may be a personal computer, a server, or a network equipment, etc.) to execute all or part of the steps of methods as described in each embodiment of the present invention. The foregoing storage medium includes various media which can store program codes: a U-disk, a mobile hard disk, a read-only memory (ROM, Read-Only Memory), a random access memory (RAM, Random Access Memory), a diskette, or a compact disk, etc.

The above descriptions are merely implementation methods of the present invention, while the protection scope of the present invention is not limited thereto. Any persons familiar with the techniques in this field may easily thought of various modifications or replacements within the scope of techniques disclosed in the present invention, all these modifications or replacements should be included in the protection scope of the present invention. Therefore, the protection scope of the present invention should be subject to the claims.

What is claimed is:

1. A method for information transmission, comprising:
   determining an enhanced transmission occasion configuration according to a channel loss magnitude with a user equipment, wherein an enhanced transmission occasion time width occupied by an enhanced transmission occasion configured by the enhanced transmission occasion configuration is greater than a non-enhanced transmission occasion time width occupied by a non-enhanced transmission occasion, and wherein the enhanced transmission occasion configuration comprises at least one of the group consisting of:
      one or more of a size and a location of a frequency resource occupied by the enhanced transmission occasion, and
      one or more of a size and a location of a time resource occupied by the enhanced transmission occasion; and
   performing an information transmission on the enhanced transmission occasion configured by the enhanced transmission occasion configuration according to a transmission type that indicates a transmission format adopted for the information transmission and that includes at least one of a number of transmission repetitions M1, a transmission time interval bundling size M2, and an aggregation level L.

2. The method according to claim 1, wherein, determining an enhanced transmission occasion configuration according to a channel loss magnitude with a user equipment, comprising:
   determining, from multiple channel loss magnitude ranges, a channel loss magnitude range to which the channel loss magnitude belongs; and
   selecting, from multiple enhanced transmission occasion configurations, the enhanced transmission occasion configuration according to the channel loss magnitude range and according to a one-to-one correspondence between the multiple enhanced transmission occasion configurations and the multiple channel loss magnitude ranges.

3. The method according to claim 2, further comprising:
   sending the multiple enhanced transmission occasion configurations corresponding to the multiple channel loss magnitude ranges to the user equipment through at least one of a radio resource control (RRC) broadcast signaling and an RRC dedicated signaling.

4. The method according to claim 3, further comprising:
   sending a transmission type corresponding to each of the multiple channel loss magnitude ranges to the user equipment.

5. The method according to claim 1, wherein determining an enhanced transmission occasion configuration according to a channel loss magnitude with a user equipment comprises:
   determining a transmission type according to a channel loss magnitude range to which the channel loss magnitude belongs; and
   determining the enhanced transmission occasion configuration according to the transmission type and an information type of information transmitted in the information transmission.

6. The method according to claim 5, further comprising:
   sending the transmission type to the user equipment.

7. A method for information transmission, comprising:
   determining an enhanced transmission occasion configuration according to a channel loss magnitude with a base station, wherein an enhanced transmission occasion time width occupied by an enhanced transmission occasion configured by the enhanced transmission occasion configuration is greater than a non-enhanced transmission occasion time width occupied by a non-enhanced transmission occasion, and wherein the enhanced transmission occasion configuration comprises at least one of the group consisting of:
      one or more of a size and a location of a frequency resource occupied by the enhanced transmission occasion, and
      one or more of a size and a location of a time resource occupied by the enhanced transmission occasion; and
   performing an information transmission on the enhanced transmission occasion configured by the enhanced transmission occasion configuration according to a transmission type that indicates a transmission format adopted for the information transmission and that includes at least one of a number of transmission repetitions M1, a transmission time interval bundling size M2, and an aggregation level L.

8. The method according to claim 7, wherein determining an enhanced transmission occasion configuration according to a channel loss magnitude with a base station, comprising:
   determining, from multiple channel loss magnitude ranges, a channel loss magnitude range to which the channel loss magnitude belongs; and
   selecting, from multiple enhanced transmission occasion configurations, the enhanced transmission occasion configuration according to the channel loss magnitude range and according to a one-to-one correspondence between the multiple enhanced transmission occasion configurations and the multiple channel loss magnitude ranges.

9. The method according to claim 8, further comprising:
   receiving the one-to-one correspondence between the multiple enhanced transmission occasion configurations and the multiple channel loss magnitude ranges from the base station.

10. The method according to claim 8, further comprising:
    receiving the multiple enhanced transmission occasion configurations sent by the base station through at least one of a radio resource control (RRC) broadcast signaling and an RRC dedicated signaling.

11. The method according to claim 9, further comprising: receiving, from the base station, a transmission type which corresponds to each channel loss magnitude range of the multiple channel loss magnitude ranges.

12. The method according to claim 7, wherein determining an enhanced transmission occasion configuration according to a channel loss magnitude with a base station comprises receiving the enhanced transmission occasion configuration sent by the base station.

13. The method according to claim 12, further comprising receiving the transmission type used for the information transmission from the base station.

14. A user equipment, comprising:
a processor, configured to determine an enhanced transmission occasion configuration according to a channel loss magnitude with a base station, wherein an enhanced transmission occasion time width occupied by an enhanced transmission occasion configured by the enhanced transmission occasion configuration is greater than a non-enhanced transmission occasion time width occupied by a non-enhanced transmission occasion, and wherein the enhanced transmission occasion configuration comprises at least one of the group consisting of:
one or more of a size and a location of a frequency resource occupied by the enhanced transmission occasion, and
one or more of a size and a location of a time resource occupied by the enhanced transmission occasion; and
a transceiver, configured to perform an information transmission on the enhanced transmission occasion configured by the enhanced transmission occasion configuration according to a transmission type that indicates a transmission format adopted for the information transmission and that includes at least one of a number of transmission repetitions M1, a transmission time interval bundling size M2, and an aggregation level L.

15. The user equipment according to claim 14, wherein the processor is further configured to:
determine, from multiple channel loss magnitude ranges, a channel loss magnitude range to which the channel loss magnitude belongs;
select, from multiple enhanced transmission occasion configurations, the enhanced transmission occasion configuration according to the channel loss magnitude range and according to a one-to-one correspondence between the multiple enhanced transmission occasion configurations and the multiple channel loss magnitude ranges.

16. The user equipment according to claim 15, wherein the transceiver is further configured to receive the one-to-one correspondence between the multiple enhanced transmission occasion configurations and the multiple channel loss magnitude ranges from the base station.

17. The user equipment according to claim 15, wherein the processor is further configured to:
receive the multiple enhanced transmission occasion configurations sent by the base station through at least one of a radio resource control (RRC) broadcast signaling and an RRC dedicated signaling.

18. The user equipment according to claim 16, wherein the transceiver is further configured to receive, from the base station, a transmission type which corresponds to each channel loss magnitude range of the multiple channel loss magnitude ranges.

19. The user equipment according to claim 14, wherein the transceiver is further configured to receive the enhanced transmission occasion configuration sent by the base station.

20. The user equipment according to claim 19, wherein the transceiver is further configured to receive the transmission type used for the information transmission from the base station.

* * * * *